(12) United States Patent
Bhargava et al.

(10) Patent No.: US 10,379,963 B2
(45) Date of Patent: Aug. 13, 2019

(54) METHODS AND APPARATUS FOR MANAGING A LARGE-SCALE ENVIRONMENT OF COPY DATA MANAGEMENT APPLIANCES

(71) Applicant: Actifio, Inc., Waltham, MA (US)

(72) Inventors: Ankur Bhargava, Wayland, MA (US); Micah Waldman, Newton, MA (US); James Charles Washburn, Jr., Dover, MA (US); Jacqueline M. Smith, Cambridge, MA (US); Jeffrey McNeil, Auburndale, MA (US); Dongjun Sun, Acton, MA (US); Yong-Min Chen, Waltham, MA (US); Qiang Fu, Bedford, MA (US)

(73) Assignee: Actifio, Inc., Waltham, MA (US)

( * ) Notice: Subject to any disclaimer, the term of this patent is extended or adjusted under 35 U.S.C. 154(b) by 617 days.

(21) Appl. No.: 14/856,132

(22) Filed: Sep. 16, 2015

(65) Prior Publication Data
US 2016/0077927 A1    Mar. 17, 2016

Related U.S. Application Data

(60) Provisional application No. 62/160,153, filed on May 12, 2015, provisional application No. 62/106,306, (Continued)

(51) Int. Cl.
*G06F 11/14* (2006.01)
*H04L 29/08* (2006.01)

(52) U.S. Cl.
CPC ...... *G06F 11/1464* (2013.01); *G06F 11/1451* (2013.01); *G06F 11/1469* (2013.01); *H04L 67/1095* (2013.01); *G06F 2201/84* (2013.01)

(58) Field of Classification Search
None
See application file for complete search history.

(56) References Cited

U.S. PATENT DOCUMENTS 4,626,829 A    12/1986    Hauck
5,381,545 A     1/1995    Baker et al.
(Continued)

OTHER PUBLICATIONS

Alapati, "NetApp Technical Report: SnapMirror Sync and SnapMirror Semi-Sync Overview and Design Considerations," NetApp, Jul. 2010 (24 pages).
(Continued)

*Primary Examiner* — Mark D Featherstone
*Assistant Examiner* — Ranjit P Doraiswamy
(74) *Attorney, Agent, or Firm* — Wilmer Cutler Pickering Hale and Dorr LLP

(57) ABSTRACT

Techniques disclosed herein provide for global management of a set of data management services being executed by at least one of one or more physical data management appliances and one or more virtual data management appliances. First instructions are transmitted to a first copy data management appliance that cause the first copy data management appliance to send first data associated with protecting a first application entity to the management server. Second instructions are transmitted to a second copy data management appliance that cause the second copy data management appliance to send second data associated with protecting a second application entity to the management server. A plurality of data management policies associated with the first copy data management appliance and the second copy data management appliance are scheduled using a third service level template, which includes a merged set of schedules for the first and second copy data management appliances.

15 Claims, 16 Drawing Sheets

US 10,379,963 B2
Page 2

Related U.S. Application Data filed on Jan. 22, 2015, provisional application No. 62/063,180, filed on Oct. 13, 2014, provisional application No. 62/051,138, filed on Sep. 16, 2014.

(56) References Cited

U.S. PATENT DOCUMENTS

| | | |
|---|---|---|
| 5,410,667 A | 4/1995 | Belsan et al. |
| 5,497,483 A | 3/1996 | Beardsley et al. |
| 5,535,381 A | 7/1996 | Kopper |
| 5,819,292 A | 10/1998 | Hitz et al. |
| 5,828,876 A | 10/1998 | Fish et al. |
| 5,857,208 A | 1/1999 | Ofek |
| 5,963,962 A | 10/1999 | Hitz et al. |
| 6,065,018 A | 5/2000 | Beier et al. |
| 6,081,875 A | 6/2000 | Clifton et al. |
| 6,119,208 A | 9/2000 | White et al. |
| 6,131,148 A | 10/2000 | West et al. |
| 6,148,412 A | 11/2000 | Cannon et al. |
| 6,163,856 A | 12/2000 | Dion et al. |
| 6,192,444 B1 | 2/2001 | White et al. |
| 6,199,146 B1 | 3/2001 | Pence |
| 6,202,071 B1 | 3/2001 | Keene |
| 6,212,531 B1 | 4/2001 | Blea et al. |
| 6,226,759 B1 | 5/2001 | Miller et al. |
| 6,269,381 B1 | 7/2001 | St. Pierre et al. |
| 6,269,431 B1 | 7/2001 | Dunham |
| 6,324,548 B1 | 11/2001 | Sorenson |
| 6,330,614 B1 | 12/2001 | Aggarwal et al. |
| 6,434,681 B1 | 8/2002 | Armangau |
| 6,460,055 B1 | 10/2002 | Midgley et al. |
| 6,477,591 B1 | 11/2002 | VanderSpek |
| 6,484,186 B1 | 11/2002 | Rungta |
| 6,487,561 B1 | 11/2002 | Ofek et al. |
| 6,557,089 B1 | 4/2003 | Reed et al. |
| 6,625,704 B2 | 9/2003 | Winokur |
| 6,654,772 B1 | 11/2003 | Crow et al. |
| 6,654,912 B1 | 11/2003 | Viswanathan et al. |
| 6,665,815 B1 | 12/2003 | Goldstein et al. |
| 6,668,264 B1 | 12/2003 | Patterson et al. |
| 6,772,302 B1 | 8/2004 | Thompson |
| 6,779,094 B2 | 8/2004 | Selkirk et al. |
| 6,823,336 B1 | 11/2004 | Srinivasan et al. |
| 6,823,436 B2 | 11/2004 | Krishnamurthy |
| 6,850,929 B2 | 2/2005 | Chang et al. |
| 6,898,688 B2 | 5/2005 | Martin et al. |
| 6,915,397 B2 | 7/2005 | Lubbers et al. |
| 6,928,526 B1 | 8/2005 | Zhu et al. |
| 6,948,039 B2 | 9/2005 | Biessener et al. |
| 6,957,362 B2 | 10/2005 | Armangau |
| 7,072,916 B1 | 7/2006 | Lewis et al. |
| 7,143,251 B1 | 11/2006 | Patterson |
| 7,222,194 B2 | 5/2007 | Kano et al. |
| 7,251,708 B1 | 7/2007 | Justiss et al. |
| 7,325,111 B1 | 1/2008 | Jiang |
| 7,346,623 B2 | 3/2008 | Prahlad et al. |
| 7,386,695 B2 | 6/2008 | Fuente |
| 7,428,657 B2 | 9/2008 | Yamasaki |
| 7,467,267 B1 | 12/2008 | Mayock |
| 7,552,294 B1 | 6/2009 | Justiss |
| 7,574,461 B1 | 8/2009 | Armorer et al. |
| 7,647,355 B2 | 1/2010 | Best et al. |
| 7,689,633 B1 | 3/2010 | Li et al. |
| 7,707,184 B1 | 4/2010 | Zhang et al. |
| 7,797,284 B1 | 9/2010 | Chellappa et al. |
| 7,814,128 B2 | 10/2010 | Silvers et al. |
| 7,937,547 B2 | 5/2011 | Liu et al. |
| 8,037,032 B2 | 10/2011 | Pershin et al. |
| 8,095,756 B1 | 1/2012 | Somavarapu et al. |
| 8,139,575 B2 | 3/2012 | Biran et al. |
| 8,150,808 B2 | 4/2012 | Zha et al. |
| 8,161,077 B2 | 4/2012 | Zha et al. |
| 8,180,740 B1 | 5/2012 | Stager et al. |
| 8,180,742 B2 | 5/2012 | Claudatos et al. |
| 8,299,944 B2 | 10/2012 | Provenzano |
| 8,407,191 B1 | 3/2013 | Nanda |
| 8,468,174 B1 | 6/2013 | Yueh et al. |
| 8,548,944 B2 | 10/2013 | Yueh |
| 8,566,361 B2 | 10/2013 | Zha et al. |
| 8,706,833 B1 | 4/2014 | Bergant et al. |
| 8,732,418 B1 | 5/2014 | Abdulla |
| 8,788,769 B2 | 7/2014 | Abercrombie et al. |
| 9,098,432 B1 | 8/2015 | Bachu et al. |
| 9,165,001 B1 | 10/2015 | Upadhyay et al. |
| 9,171,002 B1 | 10/2015 | Mam et al. |
| 9,384,200 B1 | 7/2016 | Batchu et al. |
| 9,519,432 B1 | 12/2016 | Haustein et al. |
| 2002/0111929 A1 | 8/2002 | Pudipeddi et al. |
| 2002/0129214 A1 | 9/2002 | Sarkar |
| 2003/0101321 A1 | 5/2003 | Ohran |
| 2003/0140070 A1 | 7/2003 | Kaczmarski et al. |
| 2003/0149683 A1 | 8/2003 | Lee et al. |
| 2004/0199570 A1 | 10/2004 | Terao |
| 2005/0004954 A1 | 1/2005 | Soule |
| 2005/0066095 A1 | 3/2005 | Mullick et al. |
| 2005/0138091 A1 | 6/2005 | Bono |
| 2005/0165794 A1 | 7/2005 | Mosescu |
| 2005/0192989 A1 | 9/2005 | Adiba et al. |
| 2006/0059207 A1 | 3/2006 | Hirsch et al. |
| 2006/0074945 A1 | 4/2006 | Mori |
| 2006/0129508 A1 | 6/2006 | Cannon et al. |
| 2006/0245411 A1* | 11/2006 | Chen ............... G06F 11/008 370/350 |
| 2008/0256593 A1* | 10/2008 | Vinberg ............. G06Q 10/06 726/1 |
| 2008/0270436 A1 | 10/2008 | Fineberg et al. |
| 2009/0222496 A1 | 9/2009 | Liu et al. |
| 2011/0004601 A1 | 1/2011 | Peckham et al. |
| 2011/0161295 A1 | 6/2011 | Ngo |
| 2011/0258161 A1 | 10/2011 | Constantinescu et al. |
| 2012/0123999 A1* | 5/2012 | Ashutosh .......... G06F 11/1453 707/618 |
| 2012/0124046 A1 | 5/2012 | Provenzano |
| 2012/0166448 A1 | 6/2012 | Li et al. |
| 2013/0159646 A1 | 6/2013 | Atzmon et al. |
| 2013/0318463 A1* | 11/2013 | Clifford .......... G06F 11/1453 715/772 |
| 2016/0092535 A1* | 3/2016 | Kuchibhotla ..... G06F 17/30575 707/634 |
| 2017/0010941 A1 | 1/2017 | Shimada et al. |

OTHER PUBLICATIONS

American Megatrends, Inc., "StorTrends/ManageTrends (Version 2.7) User's Guide for the StorTends 1300 Storage Appliance" Mar. 23, 2009 (378 pages).

Arrell et al., "Using RVA and SnapShot for Business Intelligence Applications with OS/390 and DB2," IBM, Redbooks, Aug. 1998 (70 pages).

Azagury et al., "Point-in-Time Copy: Yesterday, Today and Tomorrow," IBM Research Lab in Haifa, No Date Listed (pp. 259-270).

Baird, "Virtual Storage Architecture Guide (VSAG)," IEEE, No Month Listed 1995 (pp. 312-326).

Baker, "Disk-Based Mirroring Is a Lot More Than Just Safe," Computer Technology Review, No Month Listed 2000 (pp. 55-57).

Brown et al., "SnapMirror and SnapRestore: Advances in Snapshot Technology," retrieved online [URL:<<https://web.archive.org/web/20111126183455/http://www.netapp.com/tech_library/3043.html>>] No Date Listed (13 pages).

Cederqvist et al., "Version Management with CVS," No Month Listed 1992 (122 pages).

Chang et al., "Performance Analysis of Two Frozen Image Based Backup/Restore Methods," IEEE International Conference on Electron Information Technology 2005, May 22-25, 2005 (7 pages).

Chapman et al., "SnapMirror® Best Practices Guide," Network Appliance, Inc., Apr. 2006 (63 pages).

Chatterjee et al., "Efficient Replication Leveraging Information Lifecycle Management in Data Storage Systems," Provisional Patent Application No. Not Available, Feb. 9, 2009 (25 pages).

Chervenak et al., "Protecting File Systems: A Survey of Backup Techniques," Sixth Goddard Conference on Mass Storage Systems

(56) References Cited

OTHER PUBLICATIONS and Technologies, Fifteenth IEEE Symposium on Mass Storage Systems, College Park, Maryland, Mar. 23-26, 1998 (17 pages).
Chutani et al., "The Episode File System," Usenix Association, Proceedings of the Winter 1992 Usenix Conference, San Francisco, California, Jan. 20-24, 1992 (19 pages).
CommVault, "CommVault® Simpana® Quick Recovery® Software for Critical Data Center Applications and File Systems," No Month Listed 2010 (35 pages).
Dantz Development Corporation, "Retrospect® User's Guide," No Month Listed 2002 (262 pages).
Degwekar, "Using SnapMirror® with SnapDrive® for Unix®," No Month Listed 2007 (11 pages).
Delphix Corp.'s Invalidity Contentions Under Patent L.R. 3-3, Jul. 24, 2014 (27 pages).
Edwards et al., "FlexVol: Flexible, Efficient File Volume Virtualization in WAFL," Usenix Association, Usenix '08: 2008 Usenix Annual Technical Conference, No Month Listed 2008 (pp. 129-142).
You et al., "Deep Store: An Archival Storage System Architecture," Proceedings of the 21st International Conference on Data Engineering, No Month Listed 2005 (12 pages).
Zhang et al., "yFS: A Journaling File System Design for Handling Large Data Sets with Reduced Seeking," Usenix Association, Proceedings of FAST '03: 2nd Usenix Conference on File and Storage Technologies, San Francisco, California, Mar. 31-Apr. 2, 2003 (15 pages).
EMC, "Backup of Oracle in EMC Symmetrix Environments with EMC NetWorker PowerSnap," Aug. 2008 (25 pages).
Zhu et al., "Avoiding the Disk Bottleneck in the Data Domain Deduplication File System," Proceedings of the 6th Usenix Conference on File and Storage Technologies FAST 2008, San Jose, California, No Month Listed 2008 (14 pages).
EMC, "EMC Celerra Version 5.6 Technical Primer: SLA-Driven Replication with Celerra Replicator (V2): Technology Concepts and Business Considerations," Jul. 2008 (20 pages).
EMC, "EMC DL1500 and DL3000 with EMC NetWorker: Best Practices Planning," Jul. 2009 (36 pages).
EMC, "EMC TimeFinder Product Description Guide," No Date Listed (34 pages).
EMC, "Next-Generation Backup-to-Disk: Building the Foundation for Effective Operational Recovery Management," Jan. 31, 2005 (9 pages).
EMC, "Unified Backup and Recovery with EMC NetWorker," Mar. 2010 (16 pages).
Exhibit 1004 IPR2015-01689, Declaration of Ellie Young, Aug. 5, 2015 (24 pages).
Exhibit 1006 IPR2015-01678, Pfaffenberger, Webster's New World Computer Dictionary Ninth Edition, Hungry Minds, Inc., New York, New York, No Month Listed 2001 (4 pages).
Exhibit 1006 IPR2015-01689, File History for U.S. Appl. No. 12/947,393, filed Apr. 14, 2015 (108 pages).
Exhibit 1006v2 IPR2015-01689, Version 2, File History for U.S. Appl. No. 12/947,393, No Date Listed (177 pages).
Exhibit 1006v3 IPR2015-01689, Version 3, File History for U.S. Appl. No. 12/947,393, No Date Listed (150 pages).
Exhibit 1006v4 IPR2015-01689, Version 4, File History for U.S. Appl. No. 12/947,393, No Date Listed (98 pages).
Exhibit 1007 IPR2015-01678, Microsoft Computer Dictionary Fourth Edition, Microsoft Press, Redmond, Washington, No Month Listed 1999 (3 pages).
Exhibit 1007 IPR2015-01689, Declaration of Prashant Shenoy, Ph.D. in Support of Petition for Inter Partes Review, Aug. 5, 2015 (82 pages).
Exhibit 1008 IPR2015-01678, File History for U.S. Appl. No. 12/947,438, filed Apr. 14, 2015 (100 pages).
Exhibit 1008v2 IPR2015-01678, Version 2, File History for U.S. Appl. No. 12/947,438, No Date Listed (103 pages).
Exhibit 1009 IPR2015-01678, Declaration of Prashant Shenoy, Ph.D. in Support of Petition for Inter Partes Review, Aug. 5, 2015 (58 pages).
Exhibit 1010 IPR2015-01678, Rivest, "The MD5 Message-Digest Algorithm," retrieved online at [URL:<<https://www.ietf.org/rfc/rfc1321.txt>>] Apr. 1992 (20 pages).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).
Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," Jul. 3, 2015 (7 pages).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).
Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).
Exhibit A-05 to Delphix Corp.'s Preliminary Invalidity and Non-Infringement Contentions, "U.S. Pat. No. 6,915,397 ("the '397 patent") as Prior Art to U.S. Pat. No. 6,732,244," Jul. 3, 2015 (44 pages).
Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).
Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).
Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).
Exhibit A-10 to Delphix Corp.'s Preliminary Invalidity and Non-Infringement Contentions, "U.S. Pat. No. 7,072,916 ("The '916 patent") as Prior Art to U.S. Pat. No. 6,732,244," Jul. 3, 2015 (65 pages).
Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).
Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).
Exhibit A-13 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,732,244," Jul. 3, 2015 (52 pages).
Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).
Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).
Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," Jul. 3, 2015 (68 pages).
Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).

(56) References Cited

OTHER PUBLICATIONS

Exhibit A-19 to Delphix Corp.'s Preliminary Invalidity and Non-Infringement Contentions, "U.S. Pat. No. 6,779,094 ("the '094 patent") as Prior Art to U.S. Pat. No. 6,732,244," Jul. 3, 2015 (44 pages).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).
Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).
Exhibit B-01 to Delphix Corp.'s Preliminary Invalidity and Non-Infringement Contentions, "Data Domain ("Data Domain") as Prior Art to U.S. Pat. No. 6,959,369," Jul. 3, 2015 (10 pages).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).
Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).
Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).
Exhibit B-07 to Delphix Corp.'s Preliminary Invalidity and Non-Infringement Contentions, "U.S. Patent Application No. 2003/0140070 ("the '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).
Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("the '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("the '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM RAMAC Virtual Array ("RAMAC" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit B-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade The European Online Magazine for the IT Professional, vol. 2, No. 6, Dec. 2001 (8 pages).
Garrett et al., "Syncsort Backup Express and NetApp: Advanced Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).
Green et al., "Designing a Fast, On-Line Backup System for a Log-Structured File System," Digital Technical Journal, vol. 8, No. 2, No Month Listed 1996 (pp. 32-45).
Gu et al., "DB2 UDB Backup and Recovery with ESS Copy Services," IBM, Redbooks, Aug. 2002 (144 pages).
Hendricks et al., "Improving Small File Performance in Object-Based Storage," Parallel Data Laboratory, Carnegie Mellon University, Pittsburgh, Pennsylvania, May 2006 (21 pages).
Herrin et al., "The Viva File System," retrieved online at [URL: <<http://www.cs.wisc.edu/~shankar/Viva/viva.html>>] Jun. 14, 1997 (26 pages).
Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," retrieved online at [URL:<<http://www.sgi.com/Technology/xfs-whitepaper.html>>] Jun. 5, 1997 (15 pages).
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM RAMAC Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrator's Guide," Dec. 1999 (166 pages).
Isilon Systems, "Backup and Recovery with Isilon IQ Clustered Storage," Aug. 2007 (19 pages).

(56) References Cited

OTHER PUBLICATIONS

Kara, "Ext4, btrfs and the others," Linux-Kongress, The International Linux System Technology Conference, Oct. 30, 2009 (15 pages).
Keeton et al., "A Framework for Evaluating Storage System Dependability," Proceedings of the 2004 International Conference on Dependable Systems and Networks, No Month Listed 2004 (10 pages).
Kim et al., "Volume Management in SAN Environment," IEEE, No Month Listed 2001 (pp. 500-505).
Klivansky, "A Thorough Introduction to FlexClone™ Volumes," Network Appliance, Inc., Oct. 2004 (35 pages).
Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).
Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).
Lee et al., "A Comparison of Two Distributed Disk Systems," Systems Research Center, Palo Alto, California, Apr. 30, 1998 (25 pages).
Lee et al., "Petal: Distributed Virtual Disks," ACM, No Month Listed 1996 (pp. 84-92).
Legato, "Legato NetWorker Release 6.1 UNIX Version: Administrator's Guide," No Month Listed 2001 (638 pages).
Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Merrill et al., "SnapVault Best Practices Guide," NetApp, No Date Listed (29 pages).
Mesnier et al., "Object-Based Storage," IEEE Communications Magazine, Aug. 2003 (pp. 84-90).
Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).
Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).
Mullender et al., "Immediate Files," Software—Practice and Experience, vol. 14, No. 4, Apr. 1984 (pp. 365-368).
Muller et al., "A High Performance Multi-Structured File System Design," ACM, No Month Listed 1991 (pp. 56-67).
Mushran, "OCFS2: A Cluster File System for Linux: User's Guide for Release 1.4," Jul. 2008 (44 pages).
Muthitacharoen et al., "A Low-Bandwidth Network File System," ACM, No Month Listed 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManager® 2.1 for Oracle® Installation and Administration Guide," Apr. 2007 (272 pages).
Network Appliance, Inc., "Data ONTAP™ 6.3 Command Reference," Network Appliance, Inc., Sunnyvale, California, Aug. 2002 (452 pages).
Network Appliance, Inc., "Network Appliance™ SnapMirror® Software," No Month Listed 2006 (2 pages).
No Author Listed, "FDR InstantBackup™. . . Innovation Instant Solutions," Innovation Data Processing, No Date Listed (2 pages).
Osuna et al., "Data Protection Strategies in IBM System Storage N Series," IBM, Redbooks, Jun. 2008 (90 pages).
Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RAMAC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror®: File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, filed Sep. 28, 2001 (16 pages).
Quinlan et al., "Venti: A New Approach to Archival Storage," Usenix Association, Proceedings of the FAST 2002 Conference on File and Storage Technologies, Monterey, California, Jan. 28-30, 2002 (14 pages).
Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, No Month Listed 2000 (pp. 1284-1291).
Schuettinger et al., "Helping DBAs Become More Efficient: NetApp Efficiency and Manageability Advantages," NetApp, Inc., Jul. 2009 (12 pages).
Solid et al., "Network Appliance Adds SnapRestore, SnapMirror to OnTap," Computergram International, Apr. 26, 1999 (2 pages).
Solter et al., "OpenSolaris™ Bible," Wiley Publishing, Inc. Indianapolis, Indiana, No Month Listed 2009 (9 pages).
Sweeney, "xFS In-core Inode Management," retrieved online at [URL:<<http://linux-xfs.sgi.com/projects/xfs/design_docs/>>] Nov. 29, 1993 (10 pages).
Symantec Corporation, "Symantec Backup Exec Quick Recovery & Off-Host Backup Solutions for Microsoft Exchange Server 2003 & Microsoft SQL Server," No Month Listed 2005 (9 pages).
Syncsort Incorporated, "Near-Instant Oracle Cloning with Syncsort AdvancedClient Technologies," No Month Listed 2007 (12 pages).
Syncsort Incorporated, "Syncsort Backup Express Advanced Recovery for NetApp," No Month Listed 2008 (12 pages).
Tate et al., "Implementing the IBM System Storage SAN Volume Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, No Month Listed 1997 (25 pages).
Tretau et al., "IBM TotalStorage NAS Backup and Recovery Solutions," IBM, Redbooks, Jul. 2002 (226 pages).
Veritas Software Corporation, "Veritas File System 4.1 Administrator's Guide," May 2005 (270 pages).
Veritas Software Corporation, "Veritas FlashSnap Point-in-Time Copy Solutions, Administrator's Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).
Vmware, "Vmware Consolidated Backup: Best Practices and Deployment Considerations for SAN Environments," retrieved online at

(56) References Cited

OTHER PUBLICATIONS

[URL:<<https://web.archive.org/web/20080804070141/http://www.vmware.com/files/pdf/vcb_best_practices>>] No Month Listed 2007 (39 pages).
Wolf, "VM Backup Bliss? The State of VM Data Protection in the Enterprise," Burton Group, Midvale, Utah, Aug. 1, 2007 (45 pages).
International Search Report and Written Opinion issued by the U.S. Patent and Trademark Office as International Searching Authority for International Application No. PCT/US15/050391 dated Jan. 19, 2016 (12 pgs.).

\* cited by examiner

FIG. 2A

```
<change-sync> 270

<entity name="Application" src="ApplicationData" dst="ApplicationMomData" updatable="true">
    <ref name="Host" />
</entity> 271

<entity name="Host" src="HostData" dst="HostMomData" updatable="true">
</entity> 272

<entity name="Sla" src="SlaData" dst="SlaMomData" updatable="true">
    <ref name="Application" />
    <ref name="Slt" />
    <ref name="Slp" />
</entity> 273

<entity name="Slp" src="SlpData" dst="SlpMomData" updatable="true">
</entity> 274

<entity name="Slt" src="SltData" dst="SltMomData" updatable="true">
    <ref name="Policy" input="required"/>
</entity> 275

<entity name="Policy" src="PolicyData" dst="PolicyMomData" updatable="true">
</entity> 276

</change-sync>
```

METHODS AND APPARATUS FOR MANAGING A LARGE-SCALE ENVIRONMENT OF COPY DATA MANAGEMENT APPLIANCES

CROSS REFERENCE TO RELATED APPLICATIONS

This application claims the benefit under 35 U.S.C. § 119(e) of Provisional Application No. 62/051,138, filed Sep. 16, 2014, entitled "Apparatus and Computerized Methods for Copy Data Management;" Provisional Application No. 62/063,180, filed Oct. 13, 2014, entitled "Copy Data Techniques;" Provisional Application No. 62/106,306, filed Jan. 22, 2015, entitled "Apparatus and Computerized Methods for Copy Data Management;" and Provisional Application No. 62/160,153, filed May 12, 2015, entitled "Methods and Apparatus for Managing a Large-Scale Environment of Copy Data Management Appliances," the entire contents of which are incorporated by reference here in their entirety.

TECHNICAL FIELD

The techniques described herein generally relate to managing a large-scale environment of copy data management techniques, and in particular to managing multiple physical and virtual copy data management appliances.

BACKGROUND OF THE INVENTION

Current management of copy data management appliances in an enterprise environment takes an approach of element manager, in which each element manager, e.g. a desktop GUI application, manages a single appliance. To manage a pair of copy data management appliances for disaster recovery purposes normally two element manages are needed, one on the local site and the other on the remote site.

SUMMARY

In larger enterprise environments where multiple instances of copy data management appliances are used to manage data across a broad set of infrastructure, a holistic and global management solution can coordinate and orchestrate copy data management across all of the separately deployed appliances. Otherwise each appliance needs to be managed and configured separately, and information from one copy data management appliance cannot be used by other copy data management appliances.

A Global Manager, or AGM in short, is such a computerized solution, which provides features not available previously because information from multiple physical and/or virtual copy data management appliances could not be leveraged by a single device. For example, AGM can provide features such as a timeline view of tasks and a management layer to control solutions such as Snapshots, Dedupe Pools, Live Clones, Remote Replications, and movements via Dedupe Async. Tasks can be managed along the lines of applications, hosts, VMs or groups of the same. In some exemplary embodiments, the physical copy data management appliance is an Actifio CDS and the virtual copy data management appliance is an Actifio SKY instance.

FIG. 1A shows a deployment diagram of an exemplary installment of an AGM server instance 100 to manage two copy data management appliances, a CDS appliance 108 and a SKY appliance 109. Each appliance accesses a set of production data for copy data management. For example, CDS appliance 107 can access Virtual Machine application 112, Oracle Database 113, SqlServer Database 114, Exchange Server 115 and ERP application 116. SKY appliance can access ROBO (Remote Office Branch Office) application 117, Cloud application 118 and Virtual Machine application 119. The deployment diagram also shows other numbered components that are not immediately related with the techniques described herein and there are descriptions that are omitted. FIG. 1B shows a screen capture of AGM UI's Domain Manager, where two copy data management appliances, 120 and 121, have been added under the management of an exemplary AGM server appliance.

AGM can also manage a few hundred appliances for a large configuration with each appliance having managed entities up to a few hundred thousand.

In summary the techniques described herein provide mechanisms and techniques for managing a large-scale copy data management environment. The management server instance, AGM in particular, uses an efficient data capture and change tracking technique to replicate management metadata in near real-time, which also maintains referential integrity at presence of replication failures. A policy-driven approach can be applied for assigning target copy data appliance for application protection. The protected application can be reassigned at a later time and the entire backup history is maintained by the management server instance through its protection life cycle. The management server instance also maintains a set of service level agreement policies, which can be applied across multiple appliances for application protection.

The disclosed subject matter includes a computerized method of providing global management of a set of data management services being executed by at least one of one or more physical data management appliances and one or more virtual data management appliances. The method is executed by a management server comprising a processor in communication with memory storing instructions that are configured to cause the processor to transmit first instructions, from the management server, to a first copy data management appliance that cause the first copy data management appliance to send first data associated with protecting a first application entity protected by the first copy data management appliance to the management server, the first data including first service level agreement data associated with the first application entity, the first service level agreement data including a first service level template and a first service level profile, the first service level template including a plurality of first service level policies indicating a first set of schedules associated with backing up the first data, the first service level profile indicating at least one of a plurality of source storage pools and at least one of a plurality of destination storage pools associated with creating a copy of first content data associated with the first application entity. The memory stores instructions that are configured to cause the processor to transmit second instructions, from a management server, to a second copy data management appliance that cause the second copy data management appliance to send second data associated with protecting a second application entity protected by the second copy data management appliance to the management server, the second data including second service level agreement data associated with the second source entity, the second service level agreement data including a second service level template and a second service level profile, the second service level template including a plurality of second service level policies indicating a second set of schedules associated with backing up the second data, the second service level profile indicating at least one of a plurality of source storage pools and at least one of a plurality of destination storage pool associated with creating a copy of second content associated with the second application entity. The memory stores instructions that are configured to cause the processor to receive, at the management server, third data comprising instructions to create a third service level template, the third service level template including a link to the first service level template and to the second service level template such that the first set of schedules and the second set of schedule are merged into a third set of schedules. The memory stores instructions that are configured to cause the processor to create, at the management server, a list of backup images associated with the first data and the second data, and the list of backup images associated with: one of the first copy data management appliance and the second copy data management appliance, and one of the first source entity and the second source entity. The memory stores instructions that are configured to cause the processor to schedule, at the management server, a plurality of data management policies associated with the first copy data management appliance and the second copy data management appliance using the third service level template, the plurality of data management policies comprising at least one of: creating and retaining a first point in time image of first application data; creating, incrementally refreshing, and retaining a full copy of a second point in time image associated with second application data; creating and retaining a first deduplicated point in time image of third application data; creating and retaining a second deduplicated backup of fourth application data at a remote site; and creating and retaining a third deduplicated backup of fifth application data using asynchronous data replication, thereby providing global management of a set of data management services for a plurality of physical and virtual appliances.

The disclosed subject matter includes a computing system for providing global management of a set of data management services being executed by at least one of one or more physical data management appliances and one or more virtual data management appliances. The computing system includes a processor and a memory coupled to the processor. The memory includes instructions that, when executed by the processor, cause the processor to transmit first instructions to a first copy data management appliance that cause the first copy data management appliance to send first data associated with protecting a first application entity protected by the first copy data management appliance to the management server, the first data including first service level agreement data associated with the first application entity, the first service level agreement data including a first service level template and a first service level profile, the first service level template including a plurality of first service level policies indicating a first set of schedules associated with backing up the first data, the first service level profile indicating at least one of a plurality of source storage pools and at least one of a plurality of destination storage pools associated with creating a copy of first content data associated with the first application entity. The memory includes instructions that, when executed by the processor, cause the processor to transmit second instructions to a second copy data management appliance that cause the second copy data management appliance to send second data associated with protecting a second application entity protected by the second copy data management appliance to the management server, the second data including second service level agreement data associated with the second source entity, the second service level agreement data including a second service level template and a second service level profile, the second service level template including a plurality of second service level policies indicating a second set of schedules associated with backing up the second data, the second service level profile indicating at least one of a plurality of source storage pools and at least one of a plurality of destination storage pool associated with creating a copy of second content associated with the second application entity. The memory includes instructions that, when executed by the processor, cause the processor to receive third data comprising instructions to create a third service level template, the third service level template including a link to the first service level template and to the second service level template such that the first set of schedules and the second set of schedule are merged into a third set of schedules. The memory includes instructions that, when executed by the processor, cause the processor to create a list of backup images associated with the first data and the second data, and the list of backup images associated with: one of the first copy data management appliance and the second copy data management appliance, and one of the first source entity and the second source entity. The memory includes instructions that, when executed by the processor, cause the processor to schedule a plurality of data management policies associated with the first copy data management appliance and the second copy data management appliance using the third service level template, the plurality of data management policies comprising at least one of: creating and retaining a first point in time image of first application data; creating, incrementally refreshing, and retaining a full copy of a second point in time image associated with second application data; creating and retaining a first deduplicated point in time image of third application data; creating and retaining a second deduplicated backup of fourth application data at a remote site; and creating and retaining a third deduplicated backup of fifth application data using asynchronous data replication, thereby providing global management of a set of data management services for a plurality of physical and virtual appliances.

The disclosed subject matter includes a non-transitory computer readable medium having executable instructions operable to cause an apparatus to transmit first instructions to a first copy data management appliance that cause the first copy data management appliance to send first data associated with protecting a first application entity protected by the first copy data management appliance to the management server, the first data including first service level agreement data associated with the first application entity, the first service level agreement data including a first service level template and a first service level profile, the first service level template including a plurality of first service level policies indicating a first set of schedules associated with backing up the first data, the first service level profile indicating at least one of a plurality of source storage pools and at least one of a plurality of destination storage pools associated with creating a copy of first content data associated with the first application entity. The non-transitory computer readable medium having executable instructions operable to cause an apparatus to transmit second instructions to a second copy data management appliance that cause the second copy data management appliance to send second data associated with protecting a second application entity protected by the second copy data management appliance to the management server, the second data including second service level agreement data associated with the second source entity, the second service level agreement data including a second service level template and a second service level profile, the second service level template including a plurality of second service level policies indicating a second set of schedules associated with backing up the second data, the second service level profile indicating at least one of a plurality of source storage pools and at least one of a plurality of destination storage pool associated with creating a copy of second content associated with the second application entity. non-transitory computer readable medium having executable instructions operable to cause an apparatus to receive third data comprising instructions to create a third service level template, the third service level template including a link to the first service level template and to the second service level template such that the first set of schedules and the second set of schedule are merged into a third set of schedules. non-transitory computer readable medium having executable instructions operable to cause an apparatus to create a list of backup images associated with the first data and the second data, and the list of backup images associated with: one of the first copy data management appliance and the second copy data management appliance, and one of the first source entity and the second source entity. non-transitory computer readable medium having executable instructions operable to cause an apparatus to schedule a plurality of data management policies associated with the first copy data management appliance and the second copy data management appliance using the third service level template, the plurality of data management policies comprising at least one of: creating and retaining a first point in time image of first application data; creating, incrementally refreshing, and retaining a full copy of a second point in time image associated with second application data; creating and retaining a first deduplicated point in time image of third application data; creating and retaining a second deduplicated backup of fourth application data at a remote site; and creating and retaining a third deduplicated backup of fifth application data using asynchronous data replication, thereby providing global management of a set of data management services for a plurality of physical and virtual appliances.

The disclosed subject matter includes a computerized method of providing global management of a set of data management services being executed by one or more physical data management appliances and one or more virtual data management appliances. The method is executed by a processor in communication with memory storing instructions that are configured to cause the processor to transmit first instructions to a first copy data management appliance that cause the first copy data management appliance to replicate first data associated with protecting a file or application from a first source entity protected by the first copy data management appliance to form a first inventory object, the first data including first host data, first application data, and first backup data, wherein each of the first host data, the first application data, and the first backup data include a first composite key identifying the associated first copy data management appliance and the first source entity. memory storing instructions that are configured to cause the processor to transmit second instructions to a second copy data management appliance that cause the second data management appliance to replicate second data associated with protecting a file or application from a second source entity protected by the second copy data management appliance, the second data including host data, application data, and backup data, wherein each of the second host data, the second application data, and the second backup data include a second composite key identifying the associated second copy data management appliance and the second source entity, wherein replicating from the second copy data management appliance, comprises: associating the second data with the first inventory object when the second composite key matches the first composite key; and forming a second inventory object from the second data when the second composite key does not match the first composite key.

In some embodiments, the first copy data management appliance is one of a physical copy data management appliance and a virtual copy data management appliance, further wherein the second copy data management appliance is one of a physical copy data management appliance and a virtual copy data management appliance.

In some embodiments, the processor in communication with memory is configured to transmit third instructions, from a management server, to a first copy data management appliance that cause the first copy data management appliance to send first data associated with protecting a file or application from a first source entity protected by the first copy data management appliance to the management server, the first data including first service level agreement data associated with the first source entity, the first service level agreement data including a first service level template and a first service level profile, the first service level template including a plurality of first service level policies indicating a first set of schedules associated with backing up the first data, the first service level profile indicating at least one of a plurality of source storage pools and at least one of a plurality of destination storage pools associated with creating a copy of first content data associated with the first source entity. Fourth instructions can be transmitted from a management server, to a second copy data management appliance that cause the second copy data management appliance to send second data associated with protecting a file or application from a second source entity protected by the second copy data management appliance to the management server, the second data including second service level agreement data associated with the second source entity, the second service level agreement data including a second service level template and a second service level profile, the second service level template including a plurality of second service level policies indicating a second set of schedules associated with backing up the second data, the second service level profile indicating at least one of a plurality of source storage pools and at least one of a plurality of destination storage pool associated with creating a copy of second content associated with the second source entity. Third data can be received, including instructions to create a third service level template, the third service level template including a link to the first service level template and to the second service level template such that the first set of schedules and the second set of schedule are merged into a third set of schedules. A list of backup images associated with the first data and the second data can be created, the list of backup images associated with: one of the first copy data management appliance and the second copy data management appliance, and one of the first source entity and the second source entity. A plurality of data management policies associated with the first copy data management appliance and the second copy data management appliance can be scheduled using the third service level template, the plurality of data management policies comprising at least one of: creating and retaining a first point in time image of first application data; creating, incrementally refreshing, and retaining a full copy of a second point in image associated with second application data; creating and retaining a first deduplicated point in time image of third application data;

creating and retaining a second deduplicated backup of fourth application data at a remote site; and creating and retaining a third deduplicated backup of fifth application data using asynchronous data replication, thereby providing global management of a set of data management services for a plurality of physical and virtual appliances.

In some embodiments, replicating from a first copy data management appliance includes receiving a dependency mapping corresponding to an order for replication, wherein the dependency mapping includes a plurality of replication entities, the replication entities associated with the first host data, the first application data, the first backup data, the first service level template, and the first service level profile, and the first service level agreement, replicating a first replication entity of the plurality of replication entities when the first replication entity has not been replicated and does not have a depending entity that has not been replicated, finding a first depending replication entity of the plurality of replication entities when the first replication entity has not been replicated and has a depending replication entity, and replicating the first depending entity when the first depending entity has not been replicated and does not have a second depending entity that has not been replicated.

In some examples, techniques described in U.S. Patent Application Publication No. 2013/0339297, entitled "System and Method for Efficient Database Record Replication Using Different Replication Strategies based on the Database Records," filed on Jun. 18, 2013, can be leveraged by the copy data management system, which is hereby incorporated by reference herein in its entirety. For example, a Service Level Agreement (SLA) can capture the detailed business requirements with respect to secondary copies of the application data. A Service Level Template (SLT) can contain a plurality of Service Level Policies with each Service Level Policy representing one single statement in the business requirements for the protection of application data. The statement concerns the type of backups to be generated, the interval to generate the backups and the retain period of generated backups to name a few. The set of Service Level Policies applied together composes one Service Level Template (SLT). A Service Level Profile (SLP) can include all of the Service Level Policies with a particular combination of source and destination storage pool and location, say for example, source Primary Storage pool and destination local Snapshot pool, when taken together, specify the business requirements for creating copies into that particular destination pool. The resource pool requirement is captured as Service Level Profile (SLP).

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 2A is an exemplary screen capture of AGM UI's Application Manager, which shows AGM's inventory of all applications of various types of all the appliances managed by the exemplary AGM server appliance, according to some embodiments.

FIG. 2E is an exemplary xml snippet that describes the dependency relationship of inventory model used by the replication algorithm of FIG. 2D, according to some embodiments.

FIG. 3A is an exemplary screen capture of AGM UI's SLA Architect, which shows AGM's inventory of all SLA templates, according to some embodiments.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Smart Management Data Capture and Replication

Figure 2A:
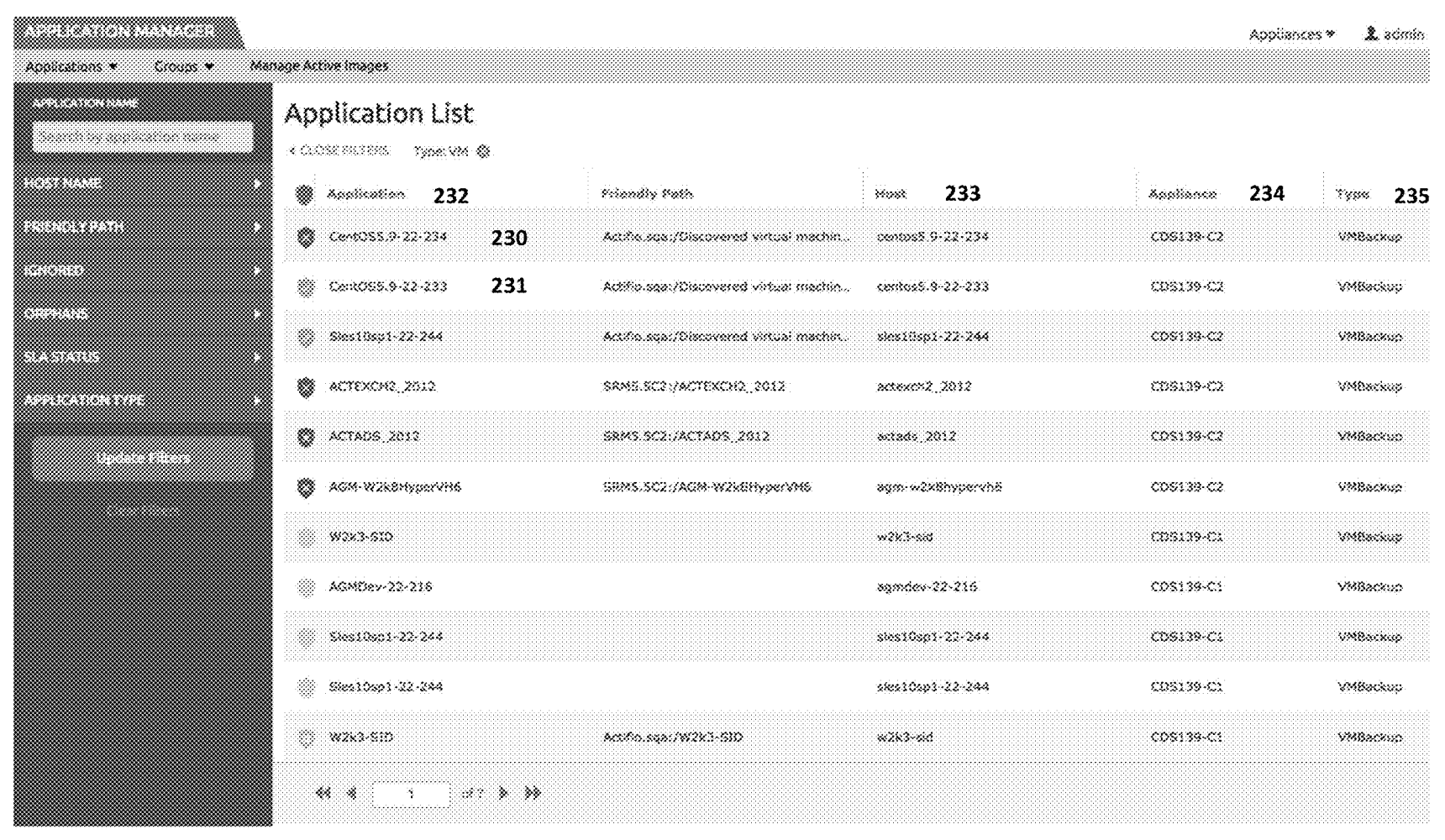

FIG. 2A is an exemplary screen capture of AGM UI's Application Manager, which shows AGM's inventory of all applications of various types of all the appliances managed by an exemplary AGM server appliance. The list of applications is shown in a tabular format with each line representing a discovered application, e.g., virtual machine 230 and 231. The attributes of an application including its name 232, host 233, type 235 and appliance 234 it resides are shown as table columns. The exemplar screen shows the filtered result of virtual machine only and only the first of seven pages all virtual machines is in display.

Figure 1A:
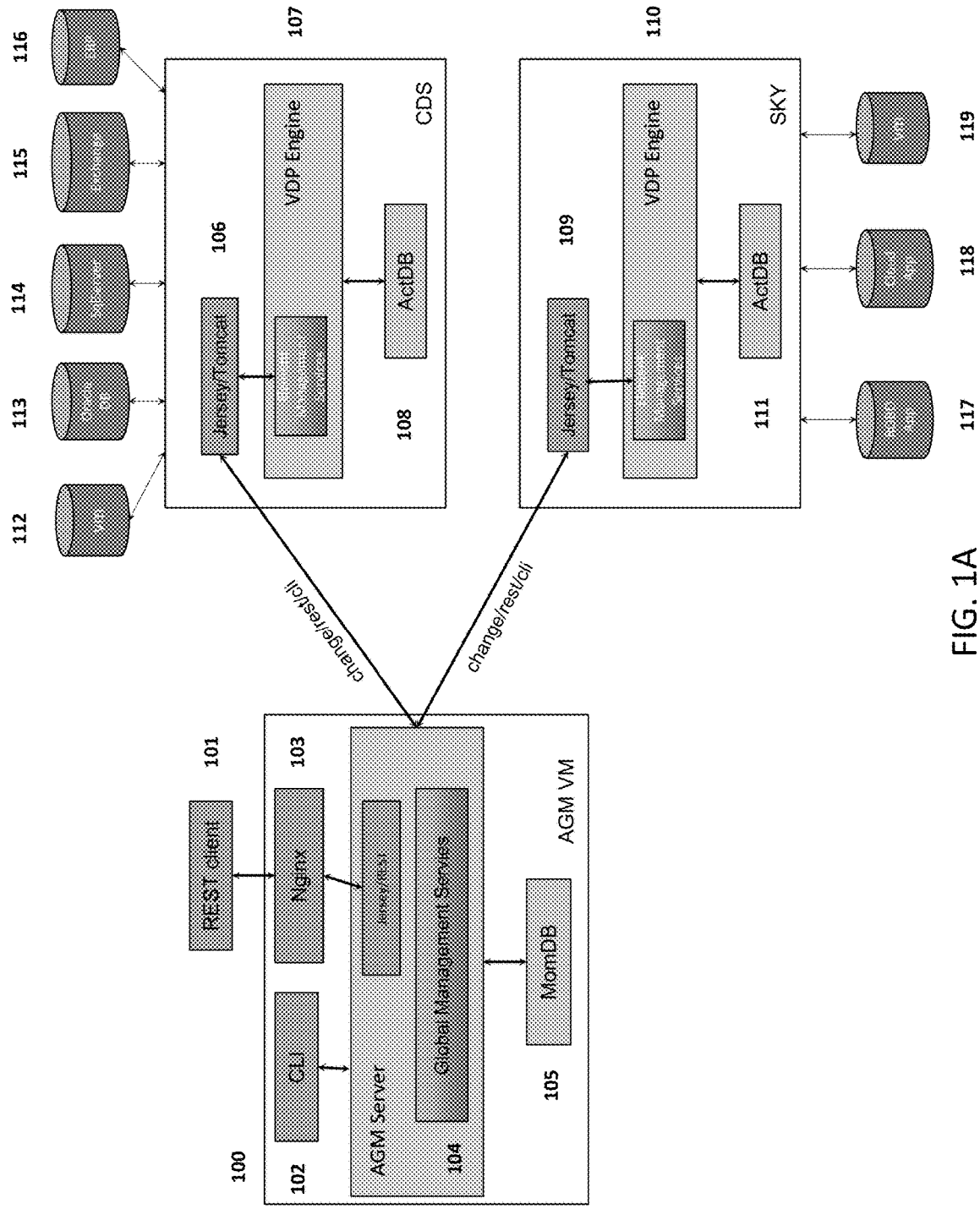
FIG. 1A is an exemplary deployment diagram of an exemplary installment of an AGM server appliance to manage two technology enabled platforms, one is a CDS instance and the other is a SKY instance, according to some embodiments.
Figure 1B:
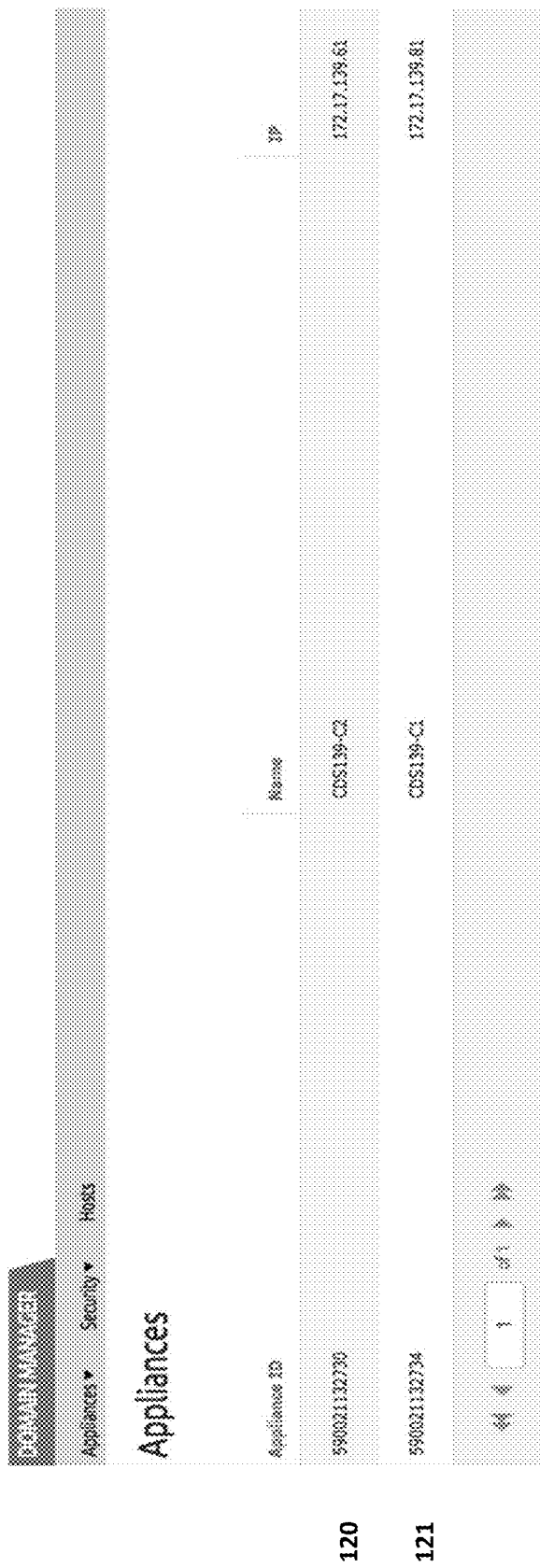
FIG. 1B is an exemplary screen capture of AGM UI's Domain Manager, which shows two copy data management appliances have been added under the management of an exemplary AGM server instance, according to some embodiments.
Figure 2B:
FIG. 2B is an exemplary screen capture of AGM UI's Application Manager, which shows backup images of an exemplary application on all AGM's member appliances, according to some embodiments.

FIG. 2B is an exemplary screen capture of AGM UI's Application Manager, which is a graphical display designed to show all the backup images of an exemplary application selected from Application Manager as embodied in FIG. 2A. In the center all the backup images of the exemplar application are shown in a ramp format. Different types of backups, Snapshot 240, Dedup 241, Liveclone 242, Remote-Dedup 243 and Dedup-Async 244, are each shown in its own lane. Snapshot is a backup image, which can be generated in an efficient way in regards to both time and disk space. A snapshot is a point in time image of data. Dedup is a backup image, which can be generated from snapshot backup and compressed using deduplication technology. Dedup images can be retained for longer period of time because they take up less space than non-deduplicated images. Remote-Dedup is a type of backup image, which can be generated from a Dedup image and sent to store at the remote appliance for disaster recovery purposes. Dedup-Async is a backup image, which can be generated from a snapshot image but sent to the remote appliance and kept up to date by periodic refresh and stands ready for restore at the remote site. Liveclone is a type of backup image, which is a full copy from the snapshot image but can be refreshed incrementally from the snapshot image. The levels of each lane represent the time series of all backups produced for that particular type. The accordion picture below the ramp shows the same information. In some embodiments, different portions of the ramp can be shown (e.g., scrolled through in terms of time). The accordion 246 can be similarly adjusted. In some embodiments, adjusting the ramp view can affect the accordion view and adjusting the accordion view can affect the ramp view. FIG. 2F shows a ramp review after moving the focus slider 247 of the accordion 246 to the end. The tab 245 of the upper corner shows the detailed information of the backup image and operations can be launched for that particular image can be launched from there.

In some embodiments, an icon associated with a backup image will change appearance (e.g., have highlighting, change color) when selected or hovered over by a cursor. Other backup images associated in time with the selected backup image can also change appearance indicating the association.

Management entity, for example, application and backup entity as embodied in FIGS. 2A and 2B is continuously monitored and replicated from member appliances to the AGM server instance through the life cycle of managing appliance.

Figure 2C:
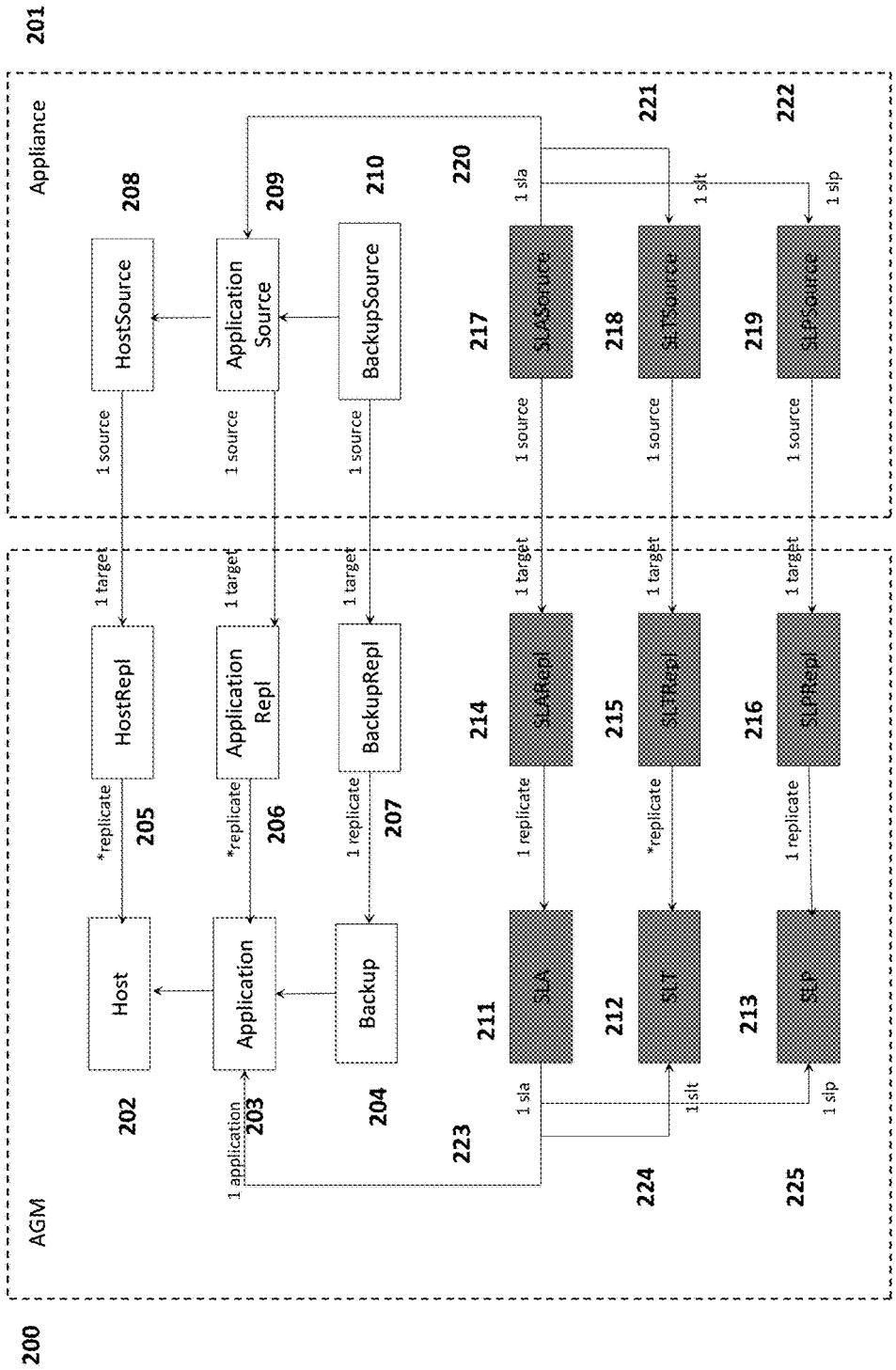
FIG. 2C is an exemplary diagram that shows AGM's different model components, which include replication model, inventory model and protection model, according to some embodiments.

FIG. 2C is a diagram which illustrates 3 models used by AGM for the life cycle of managing an appliance. The details of each model are described below.

Replication Model. Source entities embodied as Host-Source 208, ApplicationSource 209 and BackupSource 210 are replicated to AGM server instance, respectively, as HostRepl 205, ApplicationRepl 206 and BackupRepl 207. Similar protection related entities embodied as SLASource 217, SLTSource 218 and SLPSource 219 are replicated respectively as SLARepl 214, SLTRepl 215 and SLPRepl 216. For each source entity object there is a corresponding replication entity within AGM that the replication process periodically synchronizes with. Replication entities from all member appliances form the replication model of the AGM instance. To uniquely identify the link between the source entity and the replication entity a unique composite key is defined on the replication entity which consists of a pair of ids, (clusterid, srcid), where clusterid is a global unique id assigned to each appliance and srcid is the id of the source entity which is globally unique within that appliance.

Inventory Model. Once replication model is formed a correlation and identification step as part of the replication process is conducted. For each replicate entity, for example:

If an inventory object of the same type with a matching business key, for example, uuid for a vCenter server, exists, the replicate entity will be associated with the existing inventory object.

If no previous inventory entity object with a matching business key exists, a new one will be created and associated with incoming replicate entity.

As embodied in FIG. 2C inventory entities such as Host 202, Application 203 and Backup 204 are identified from replicate entities, respectively, HostRepl 205, ApplicationRepl 206 and BackupRepl 207. Similarly protection related inventory entities embodied as SLA 211, SLT 212 and SLP 213 are identified from replicate entities, respectively, SLARepl 214, SLTRepl 215 and SLPRepl 216. The inventory entities correlated and identified from replicate entities form the inventory model of the AGM instance. Some exemplary use cases of the inventory model are described below:

If an Application, for example, a VMware virtual machine, is discovered or protected on multiple appliances, the correlation and identification step will identify all source entities that represent the same Application as a single AGM entity. This enables AGM to provide a consolidated view of all the Backups for that Application that otherwise can only be seen partially from a single appliance. The AGM inventory model also enables the techniques described below in "Move SLA" section.

The management functionalities and interfaces are defined using AGM inventory model, which abstracts out underlying differences represented by the replication model constructed out of source entities of different types of appliances.

When a provisioning operation, like mounting a snapshot image, to a target application, is conducted against an AGM inventory entity, the corresponding replicate entity is located which provides the link back to the source entity of the appliance. The provisioning operation is then carried out on the source appliance.

Protection Model. Following inventory model construction the relationships for application protection embodied as SLASource_ApplicationSource 220, SLASource_SLTSource 221 and SLASource_SLPSource 222 are fully replicated and reconstructed at AGM using inventory entities, which is embodied as SLA_Application 223, SLA_SLT 224 and SLA_SLP 225.

AGM can be designed to manage multiple appliances ranging from a few dozen for a small to medium-sized configuration to a few hundred for a large configuration. Each appliance can have a large number of managed entities, ranging from a few thousand to a few hundred thousand, to replicate to AGM. The data capture and replication techniques can be based in part upon the section of "Smart Data Synchronization" in U.S. Patent Application Publication No. 2013/0339297.

U.S. Patent Application Publication No. 2013/0339297 describes a set of techniques of replicating management entities. Management entities of individual types are replicated incrementally but different types of entities are replicated without consideration of their interdependency. As embodied in FIG. 2C ApplicationRepl 206 can be replicated before HostRepl 205. For AGM this causes a violation of referential integrity, as an application entity cannot exist without its containing host entity. A host, modeled as a host entity, is a physical or a virtual server, which runs an operating system, e.g., a Windows server or a Linux server. In an enterprise environment each host can run one or multiple applications for business solutions. The application can be file systems, database servers, email servers, content servers and virtual machines. Each application, modeled as an application entity, consumes disk spaces to store data critical to business processes. The data of each application needs to be backed up periodically to prevent data loss and for auditing. Each backup of all disk spaces consumed by the application is modeled as one backup entity and application entities can contain many such backup entities.

Unlike previous technologies, the techniques described herein preserve referential integrity of AGM inventory. Source entities of different types of appliances are replicated in a topological order calculated from a predefined dependency graph, which describes parent-child relationship among related entities. In doing so the referential integrity among all related entities are preserved. The replication algorithm tolerates the restart of either AGM or the target appliance when replication is on the fly. The algorithm also tolerates failure of replication of any single type of entities without compromising the referential integrity of the AGM inventory.

Figure 2D:
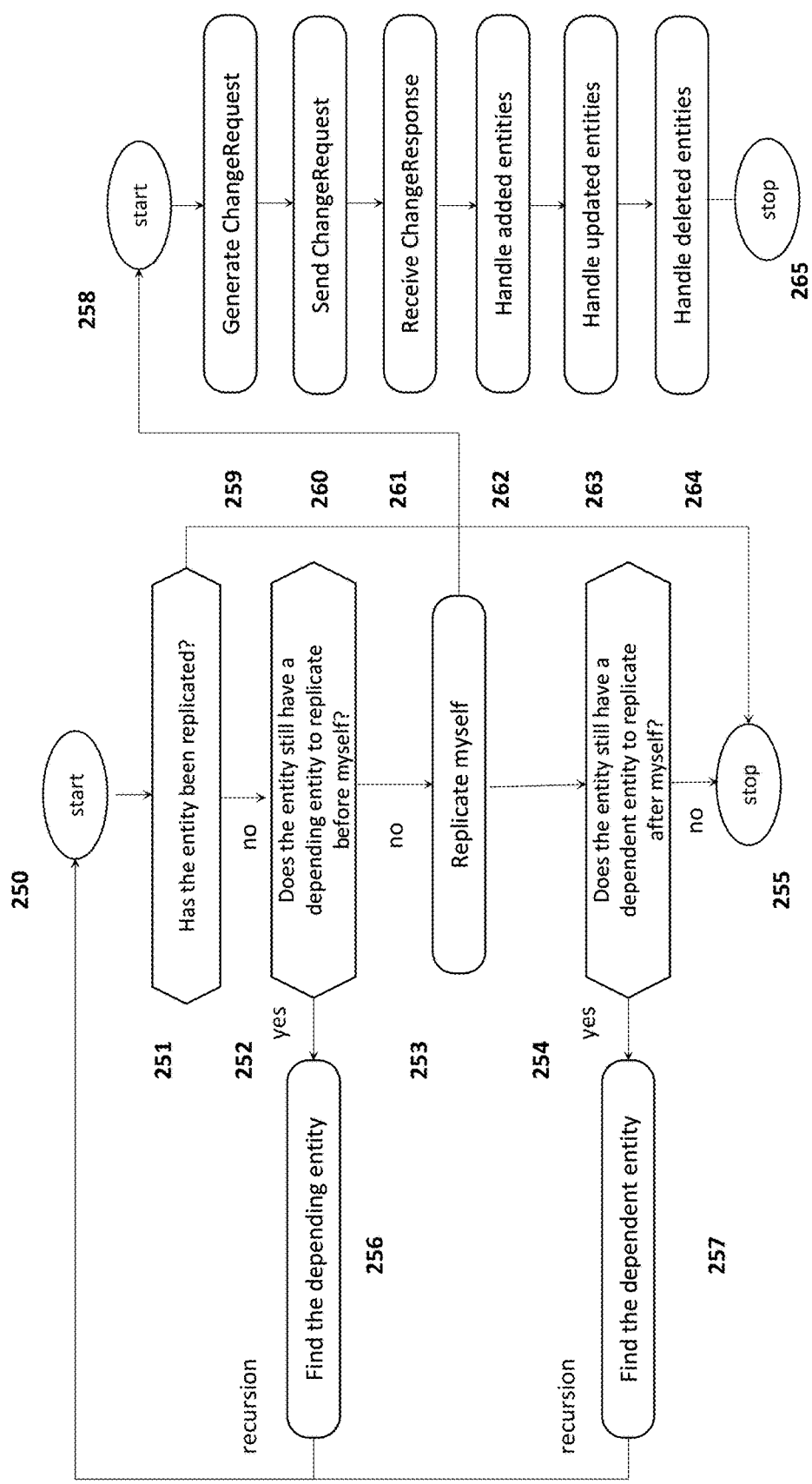
FIG. 2D is an exemplary flow chart that illustrates the algorithm of smart management data capture and replication, according to some embodiments.
Figure 2F:
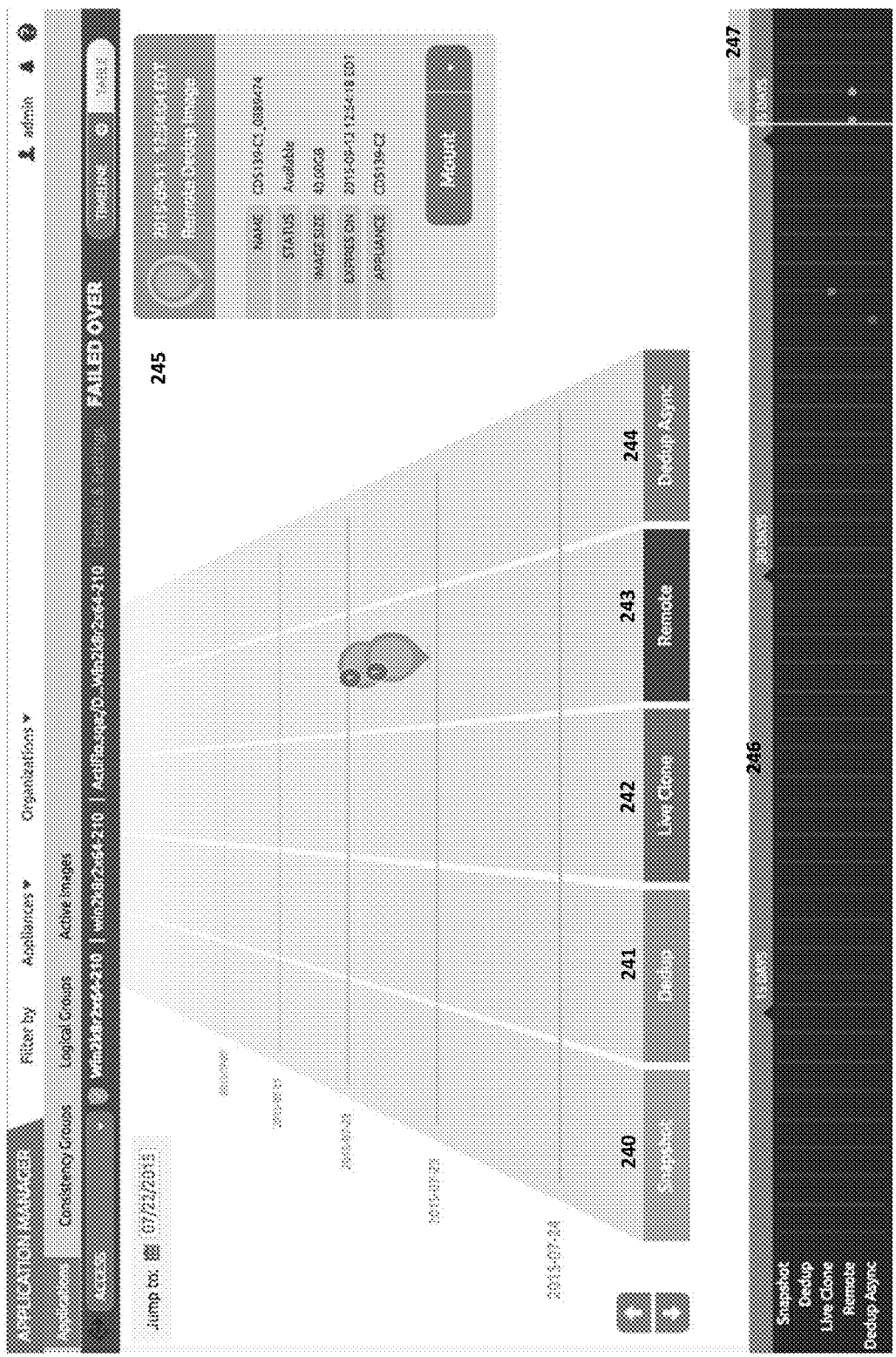
FIG. 2F is an exemplary screen capture of AGM UI's Application Manager, which shows backup images of an exemplary application on all AGM's member appliances, according to some embodiments.

FIG. 2D is an exemplary flow chart that illustrates this algorithm of smart management data capture and replication. The algorithm traverses a predefined dependency graph embodied by the xml snippets in FIG. 2E. The algorithm as such is recursive in nature.

When the algorithm starts to replicate an entity, it first checks if the entity has been replicated or not by condition check 251. If the condition check passes then the recursion step of replicating the entity is done and control moves to stop 255. If the entity has not been replicated, control moves to condition check 252. In step 252 if there are any depending entities that need to be replicated before current entity, control moves to step 256 and finds the first depending entity the algorithm needs to replicate. The function implementing the algorithm then recurses by calling itself again to replicate the depending entity, which moves control to start 250. If all depending entities have been replicated by passing condition check 252, control moves to step 253 to replicate the current entity. Step 253 is composed of a series of small steps from step 258 to step 265, which can be based in part on "Smart DataSynchronization" described in U.S. Patent Application Publication No. 2013/0339297, except step 264, which is described further below. Once step is finished control moves to condition check 254. If there are any dependent entities that need to be replicated after the current entity, control moves step 257 and finds the first dependent entity the algorithm needs to replicate. The function implementing the algorithm then recurses by calling itself again to replicate the dependent entity, which moves control to start 250. If all dependent entities have been replicated by passing condition check 254, control moves to stop 255 finishing up replicating the entity.

The algorithm described above requires finding both the parent and child entities of current replicating entity. The parent-child relationship is embodied by the xml snippet of FIG. 2E. Element 270 defines the dependency schema. Element 271 states that Application depends on Host. Element 272 states that Host has no dependencies. Element 273 states that SLA depends on a list of entities of Application, SLT and SLP. Element 275 states that SLT depends on Policy. Element 274 states that SLP has no dependencies and Element 276 states that Policy has no dependencies.

Step 258 to step 265, which can be based in part on "Smart DataSynchronization" of U.S. Patent Application Publication No. 2013/0339297, can attempt to guarantee the fault tolerance of replication failure of a single entity type as below, No partial replication. An entity is either fully replicated or not at all.

Restart of replication. Replication can always be restarted at where it was left off.

Step 250 to step 257 provides the following additional guarantee when replication of a particular entity type fails, No referential constraint violation. Successfully replicated entities have their entire parent entities successfully replicated as well.

Restart of replication. Replication of different entity types always follows the same predefined order and can be restarted at any point of the dependency graph where it was left off.

These techniques can provide efficiency since as the replication of individual entity types is incremental. Only entities changed since last replication are replicated.

Regarding step 264 of FIG. 2D previous techniques replicated deleted objects by sending all known IDS from a requesting side to a target appliance. This can cause one or more of the following performance issues:

The AGM inventory can hold entity objects per type for multiple appliances, each of which can have a large number of objects. Generating a complete ID list per object type per appliance can be expensive.

Filtering out deleted IDs based on AGM's sent known IDs is also an expensive operation, which further reduces response time.

Step 264 implements a newly introduced mechanism of keeping track of deleted entities on the target appliances using, for example, a "tombstone" table:

```
CREATE TABLE tombstone (
    id              BIGINT NOT NULL,
    typename        VARCHAR(64) NOT NULL,
    enddate         TIMESTAMP NOT NULL,
    PRIMARY KEY(id, typename)
);
```

Upon deletion of any tracked entity type within the target appliance a record is entered into the tombstone table to record its deletion. When retrieving deleted records from target appliance instead of sending all known IDs AGM just sends (MaxKnownID, type). Any IDs smaller than MaxKnownID for a particular entity type that exists in the "tombstone" table are turned to the AGM side and its AGM inventory object would be deleted accordingly. Periodically the tombstone table is purged based on the replication history of individual entity types.

Combined the techniques described above can be utilized so that AGM can manage a large-scale data protection environment leveraging the appliances.

Distributed Policy-Driven Data Protection Using Centrally Managed Service Level Templates Upon construction of AGM entity inventory the service level templates and their associated policies go through a correlation and conflict resolution process. A protection model is then created on top of newly identified AGM entities, which consists of a set of centrally managed set of service level templates with identified and correlated replicas distributed across appliances managed by the AGM instance.

Figure 3A:
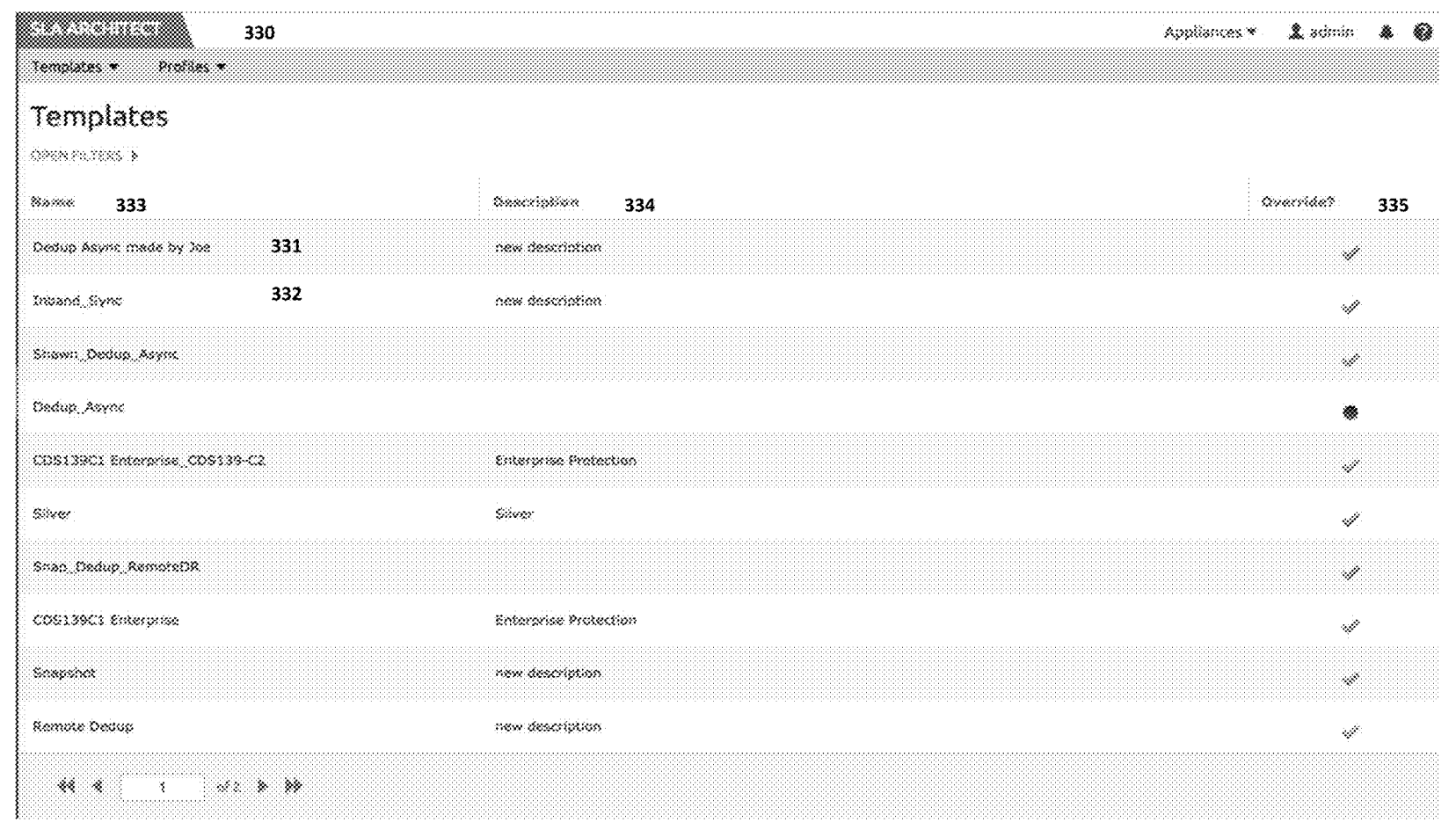
Figure 3B:
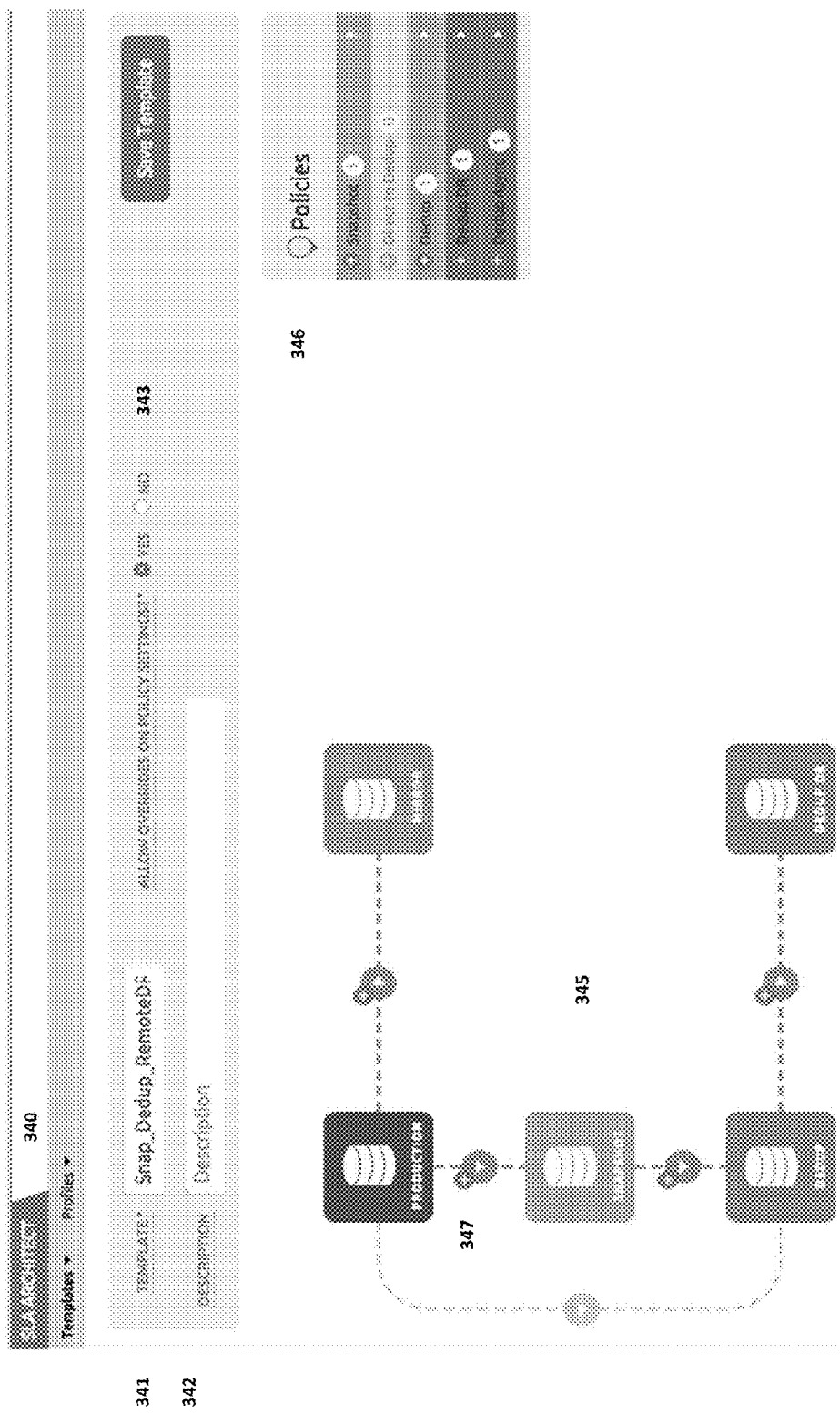
FIG. 3B is an exemplary screen capture of AGM UI's SLA Architect, which shows the content of an exemplary SLA template, according to some embodiments.
Figure 3C:
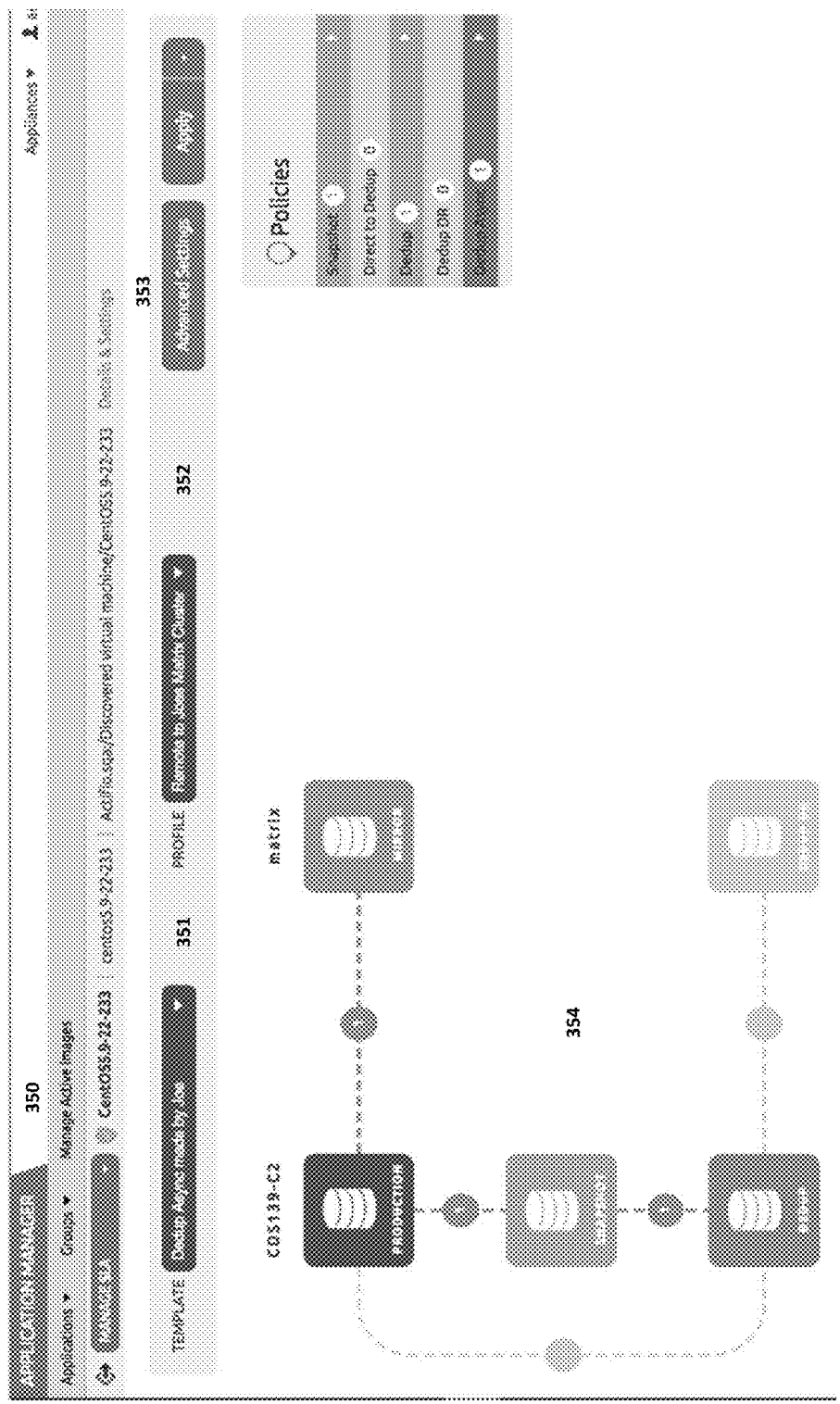
FIG. 3C is an exemplary screen capture of AGM UI's Application Manager, which shows the protection of an exemplary application by a centrally managed AGM SLA template, according to some embodiments.

FIG. 3A is an exemplary screen capture of AGM UI's SLA Architect 330, which shows AGM's inventory of all SLA templates. All the service level templates are listed in a tabular format with each line representing a managed template, e.g. service template 331 and 332. The attributes of a template including its name 333, description 334 and whether it can be overridden, 335, are shown as table columns. The exemplar screen shows the first of two pages of all templates. FIG. 3B is an exemplary screen capture of AGM UI's SLA Architect, which shows the content of an exemplary SLA template 340. The screen shows the template's name 341, description 342 and control of the override flag at the top 343. In the center is a graphical representation 345 of various service level policies the template is composed of. The tab 346 on the right shows the service level policies in a list format. Clicking on the "+" sign 347 of the graph opens up its corresponding editing pane within the right side tab. FIG. 3C is an exemplary screen capture of AGM UI's Application Manager 350, which shows the protection of an exemplary application using a centrally managed AGM SLA template. The service level template 351 and the service level profile 352 used for protecting the exemplar application are shown at the top. The blue buttons on the right controls the advanced settings 353 of the protection and enabling and disabling of the protection. In the center is the graph 354 of the service level polices the service template is composed of. The difference of FIG. 3C and FIG. 3B is that FIG. 3C shows all defined policies while FIG. 3B shows all possible policies that can be defined.

Figure 3D:
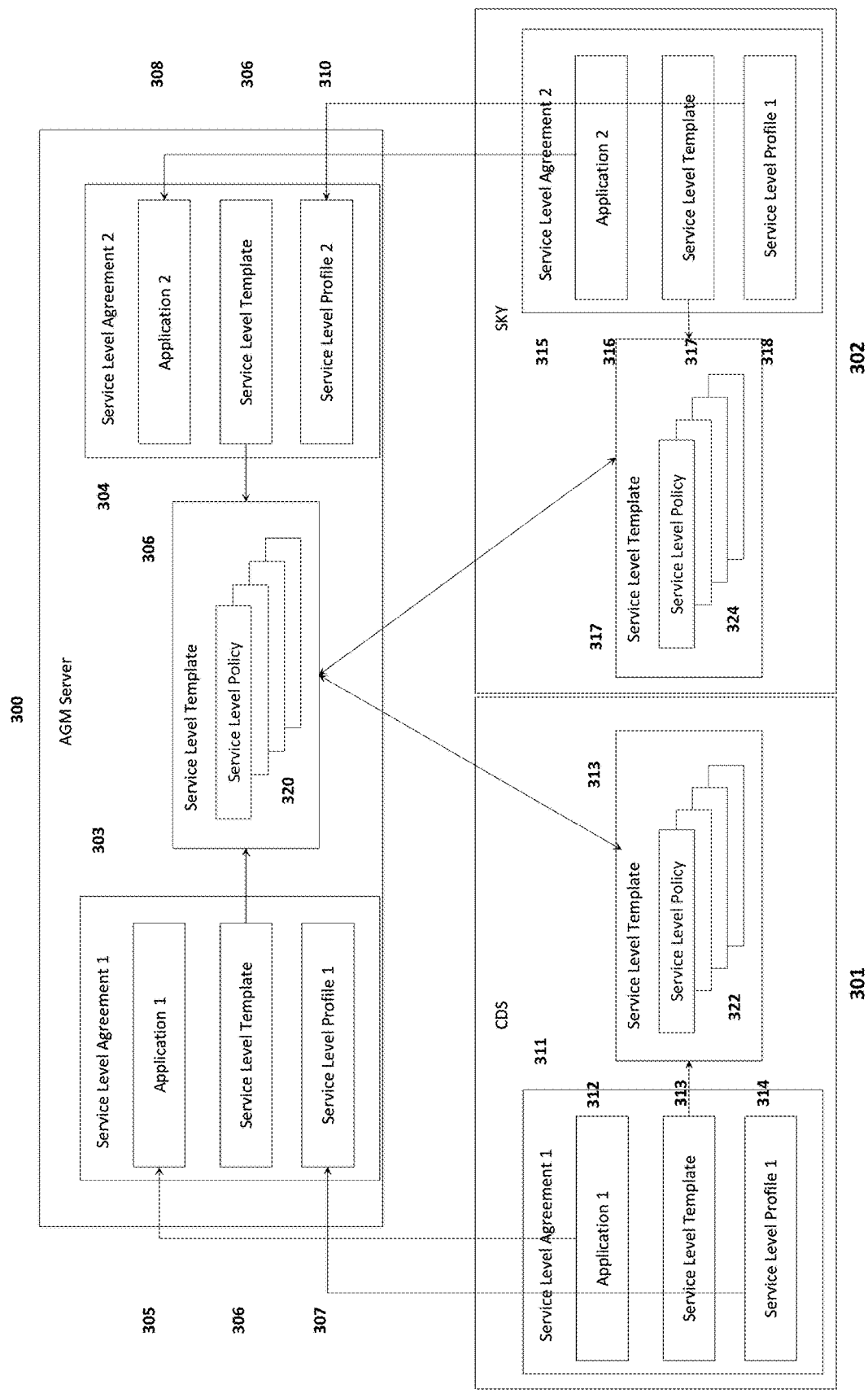
FIG. 3D is an exemplary diagram which shows the policy-driven approach that AGM adopts to centrally manage the inventory of SLA templates which could be distributed among all member appliances, according to some embodiments.

FIG. 3D is an exemplary diagram which the policy-driven approach that AGM adopts to centrally manage the inventory of SLA templates which could be distributed among all member appliances. Within AGM inventory 300 an application embodied as Application 305 has been replicated from an appliance 301 and hence backed by a replica of Application 312. It is protected by a SLA template 306 backed by a replica of SLA template 313 and a SLP backed by a replica of SLP 314. Similarly an application embodied as Application 308 is protected a SLA template 306 and also a SLP 310, which are backed respectively by the SLA template replica 317 and SLP replica 318 on appliance 318. It should be pointed out two different SLAs, SLA 303 and SLA 304, are sharing a common service level template SLT 306, which are backed respectively by two identical replicas with each on a different appliance, which is embodied as a service level template 313 on appliance 301 and a service level template 317 on appliance 302. Upon construction of the protection model AGM will tag all correlated and identified service level templates to be owned by the AGM instance preventing them from further modification from the appliance side, which is termed as promotion. Changes of promoted service level templates can only be pushed from AGM side. As embodied in FIG. 3D the content of service level template replicas, SLT 313 on appliance 301 and SLT 317 on appliance 302, are semantically identical to that of SLT 306 within AGM 300. Changes may only be made to SLT 306 on AGM side and pushed from SLT 306 to SLT replica 313 and SLT replica 317 in that direction.

AGM can adopt a "lazy" push policy. When a service level template is initially created on AGM, it is not pushed to all appliances immediately. When protecting an application on a target appliance, all service level templates visible to the application on the target appliance are presented. The visible set of service level templates includes all templates originated from the appliance and also all newly created AGM service level templates that have not been pushed to the appliance. If any of the AGM service level templates that does not have a replica on the target appliance is chosen, the template will be pushed down from AGM first before a SLA is created on the target appliance using the newly pushed service level template. This lazy push policy makes sure that only the appliance that actively uses the service template will receive the replica, which saves bandwidth and also reduces the chance of a partial failure when pushing service level template changes.

Move SLA

Figure 4A:
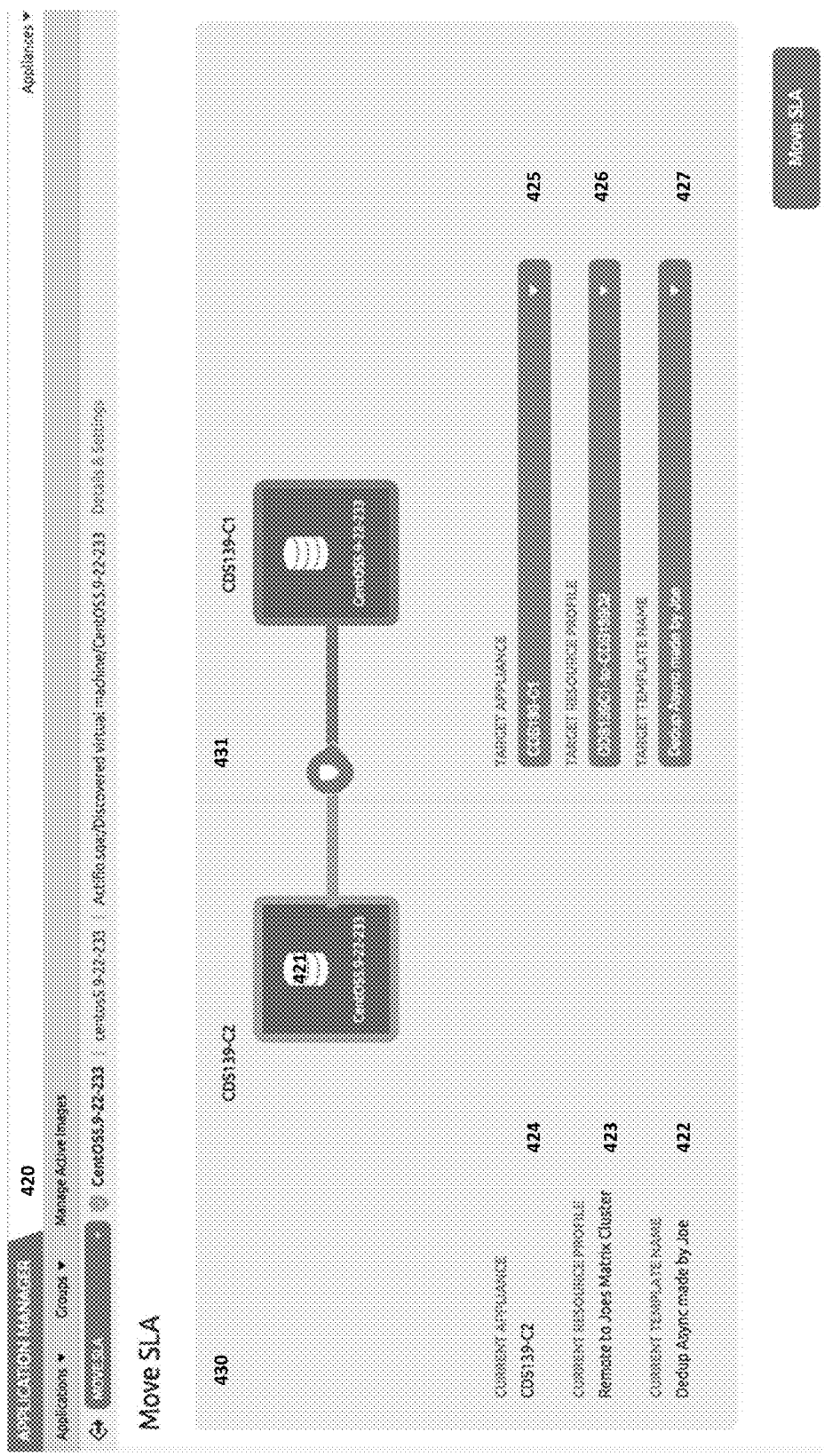
FIG. 4A is an exemplary screen capture of AGM UI's Application Manager, which shows the unique feature enabled by AGM to migrate the protection of a virtual machine application from one member appliance to another, according to some embodiments.

The capability of correlation and identification of the same application discovered on multiple appliances with AGM inventory is a unique feature in AGM. FIG. 4A is a screen capture of AGM UI's Application Manager 420, which showcases the feature of migrating the protection of a virtual machine application from one member appliance to another. The left pane 430 of the UI shows the current protection status of the application on the source appliance 424. The exemplar application 421 is protected by a service level template 422 listed under "current template name" and a service level profile 423 listed under "current resource profile". The right pane 431 of the UI shows the required parameters for re-protecting the application on the target appliance. For example, the parameters include: the target appliance 425, the target service level template 426 and the target service level profile 427.

Figure 4B:
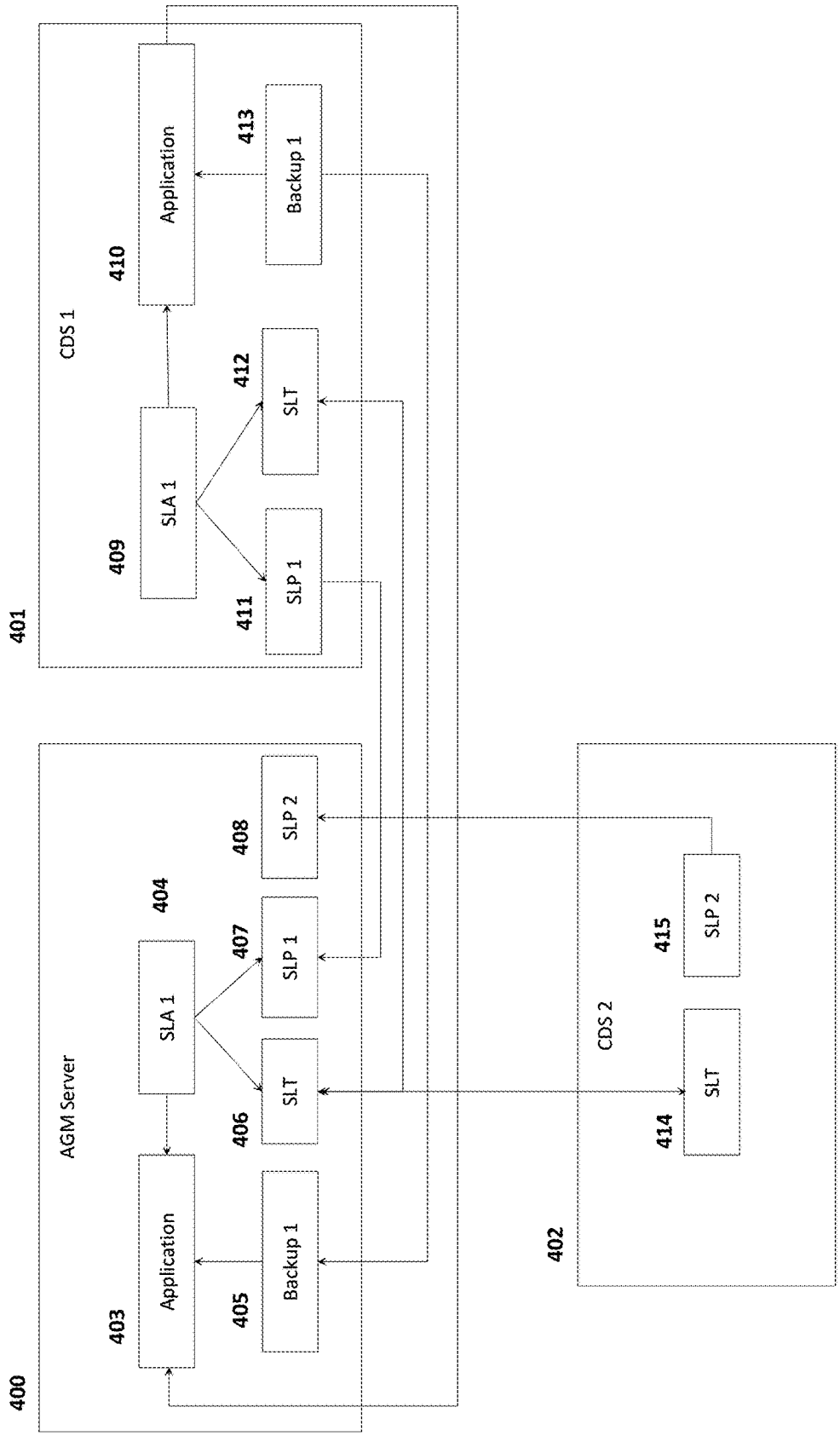
FIG. 4B is an exemplary diagram which shows the pre-migration inventory objects related with a particular virtual machine application among AGM server appliance, the source appliance and the target appliance, according to some embodiments.

FIG. 4B is a diagram which shows the pre-migration inventory objects related with a particular virtual machine application among AGM server appliance, the source appliance and the target appliance. As embodied inside Appliance 401 Application 410 is protected by SLA1 409, which refers to SLT 412 and SLP1 411. The protection has created a Backup1 413.

AGM inventory has the source entities from appliance 401 fully replicated. The embodiments of the diagram show that inside AGM instance 400 Application 403 are protected by SLA1 404, which refers to SLT 406 and SLP1 407. The Application has created a Backup 405. All the above inventory entities are replicated from source appliances, respectively, Application 410, SLA1 409, SLT 412 and SLP1 411. And AGM inventory's Backup1 405 is replicated from appliance's Backup1 413. The diagram also shows the required parameters for conducting the "Move SLA" operation, among which SLT 406 has been pushed down to appliance 402 and appliance's SLP 415 has been replicated to AGM as SLP2 408.

Figure 4C:
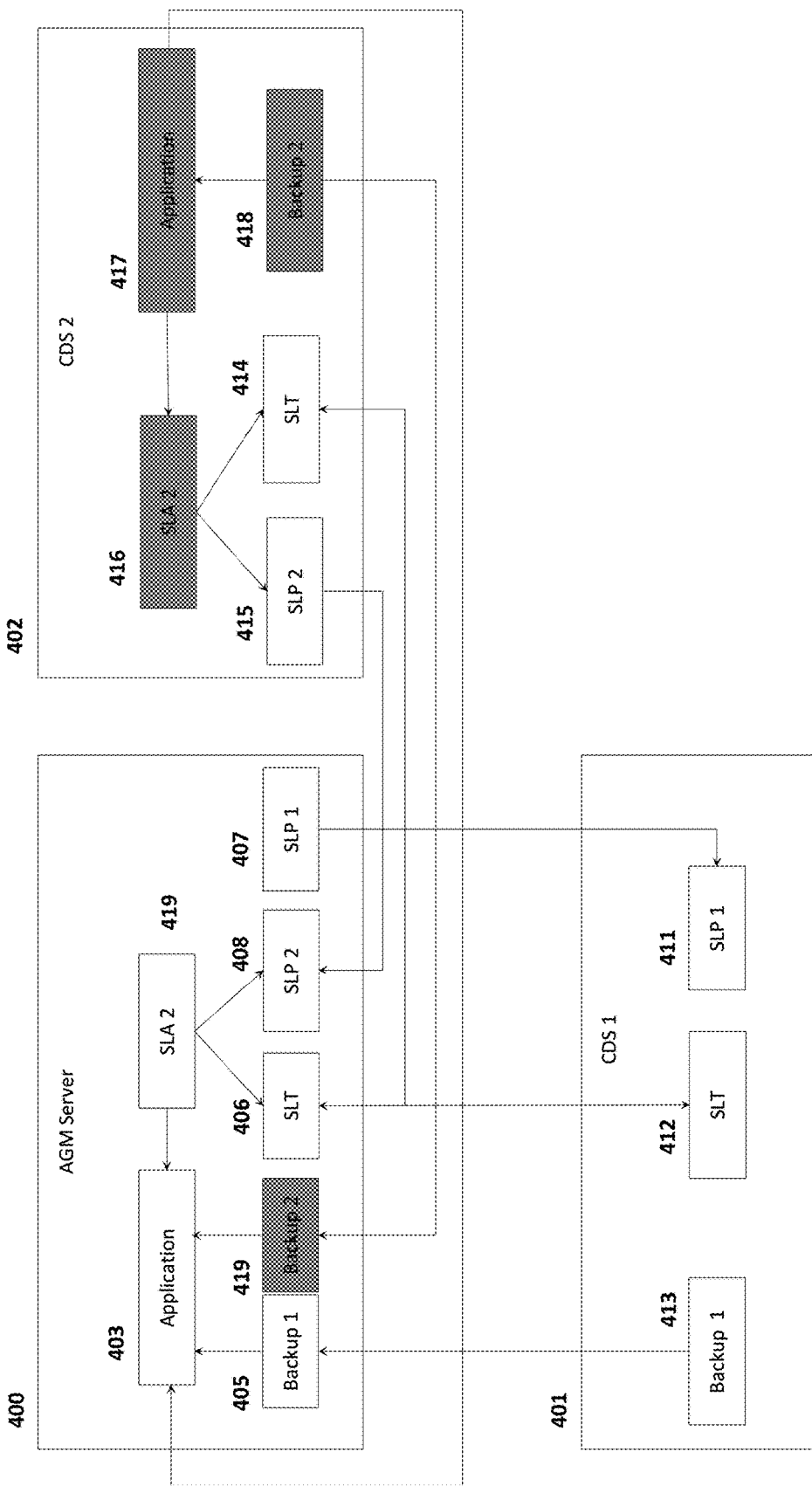
FIG. 4C is an exemplary diagram which shows the post-migration inventory objects related with a particular virtual machine application among AGM server appliance, the source appliance and the target appliance, according to some embodiments.

FIG. 4C is a diagram which shows the post-migration inventory objects related with a particular virtual machine application among AGM server appliance, the source appliance and the target appliance. The diagram shows that the target appliance 402 has Application 417 rediscovered and protected with a new SLA2 416, which refers to SLT 414 and SLP2 415. A new Backup2 418 has been produced in appliance 402. The newly created entities in target appliance 402 are fully replicated to AGM inventory, respectively, as Application 402, SLA2 419, SLT 406, SLP2 408 and backup2 419.

It is worth noting the Application 410 has been unprotected on source appliance 402 and has been removed from that appliance. However Backup1 413 still exists on source appliance 401 subject to expiration.

Application 403 preserves its identity during the entire process of Move SLA in AGM server 400 even the protection of the application has moved from SLAT of appliance 401 to SLA2 of appliance 402. Also Application 403 keeps track of all backup images during the life cycle of the protection of the application, respectively embodied as Backup1 405 from appliance 401 and Backup2 419 from appliance 402.

Figure 5:
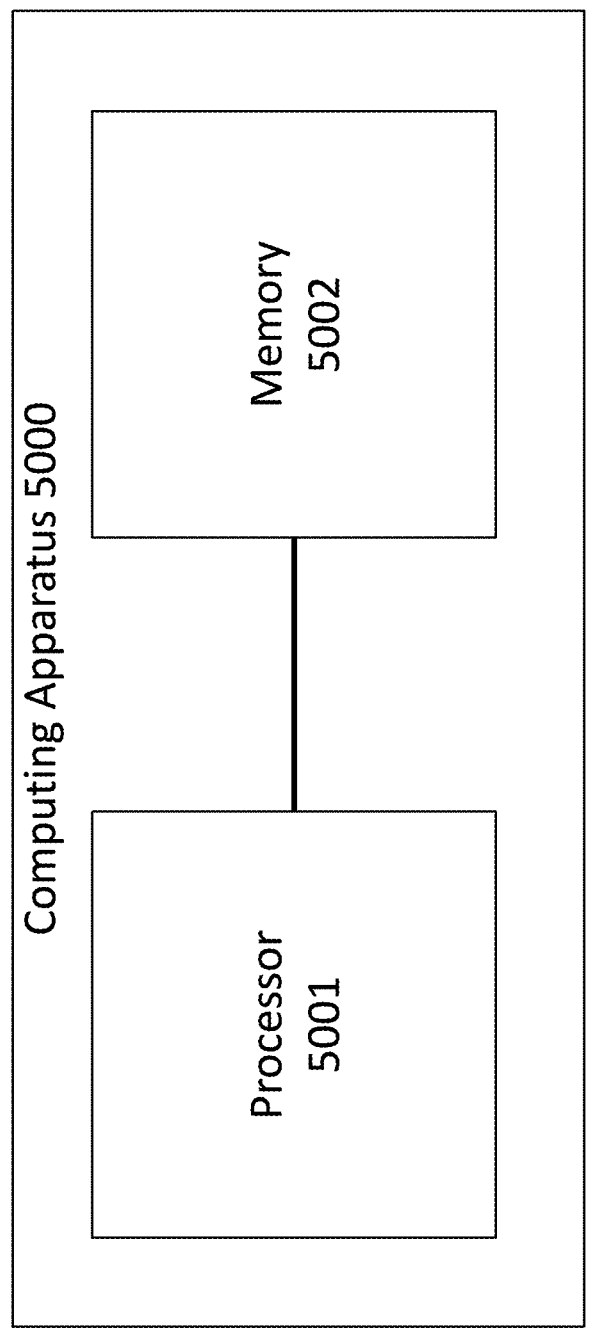
FIG. 5 illustrates an exemplary apparatus configured to provide global management for copy data appliances, according to some embodiments.

FIG. 5 illustrates an exemplary apparatus configured to provide global management for copy data appliances, according to some embodiments.

FIG. 5 illustrates an exemplary computerized apparatus 5000 configured to provide a global management solution, according to some embodiments. Computerized apparatus 5000 includes a processor 5001 in communication with temporary and/or permanent memory 5002. Memory 5002 stores instructions and is configured to cause the processor 5001 to perform the subject matter described herein, including the apparatuses (e.g., servers, data appliances) and methods disclosed in the figures above. As described further herein, the memory 5002 can be flash memory, a magnetic disk drive, an optical drive, a programmable read-only memory (PROM), a read-only memory (ROM), or any other memory or combination of memories. The processor 5001 can be a general purpose processor and/or can also be implemented using an application specific integrated circuit (ASIC), programmable logic array (PLA), field programmable gate array (FPGA), and/or any other integrated circuit. The computerized apparatus 5000 can include a database that may also be flash memory, a magnetic disk drive, an optical drive, a programmable read-only memory (PROM), a read-only memory (ROM), or any other memory or combination of memories. The computerized apparatus 5000 can execute an operating system that can be any operating system, including a typical operating system such as Windows, Windows XP, Windows 7, Windows 8, Windows Mobile, Windows Phone, Windows RT, Mac OS X, Linux, VXWorks, Android, Blackberry OS, iOS, Symbian, or other OSs.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computerized method of providing global management of a set of data management services being executed by at least one of one or more physical data management appliances and one or more virtual data management appliances, the method being executed by a management server comprising a processor in communication with memory storing instructions that are configured to cause the processor to:

transmit first instructions, from the management server, to a first copy data management appliance that cause the first copy data management appliance to send first data associated with protecting a first application entity protected by the first copy data management appliance to the management server, the first data including first service level agreement data associated with the first application entity, the first service level agreement data including a first service level template and a first service level profile, the first service level template including a plurality of first service level policies indicating a first set of schedules associated with backing up the first data, the first service level profile indicating at least one of a plurality of source storage pools and at least one of a plurality of destination storage pools associated with creating a copy of first content data associated with the first application entity;

transmit second instructions, from a management server, to a second copy data management appliance that cause the second copy data management appliance to send second data associated with protecting a second application entity protected by the second copy data management appliance to the management server, the second data including second service level agreement data associated with the second source entity, the second service level agreement data including a second service level template and a second service level profile, the second service level template including a plurality of second service level policies indicating a second set of schedules associated with backing up the second data, the second service level profile indicating at least one of a plurality of source storage pools and at least one of a plurality of destination storage pools associated with creating a copy of second content associated with the second application entity;

receive, at the management server, third data comprising instructions to create a third service level template, the third service level template including a link to the first service level template and to the second service level template such that the first set of schedules and the second set of schedule are merged into a third set of schedules;

create, at the management server, a list of backup images associated with the first data and the second data, and the list of backup images associated with:
one of the first copy data management appliance and the second copy data management appliance, and
one of the first application entity and the second application entity;

schedule, at the management server, a plurality of data management policies associated with the first copy data management appliance and the second copy data management appliance using the third service level template, the plurality of data management policies comprising at least one of:
creating and retaining a first point in time image of first application data;
creating, incrementally refreshing, and retaining a full copy of a second point in time image associated with second application data;
creating and retaining a first deduplicated point in time image of third application data;
creating and retaining a second deduplicated backup of fourth application data at a remote site; and
creating and retaining a third deduplicated backup of fifth application data using asynchronous data replication;

move protection of the first application entity from the first copy data management appliance to the second copy data management appliance; and display the list of backup images, wherein displaying the list of backup images includes:
displaying an adjustable ramp, the ramp including an x-axis associated with the plurality of data management policies and a y-axis associated with the time points associated with the plurality of data management policies, the ramp movable along the y-axis, wherein the associated data management policies of the x-axis include at least two of:
creating and retaining a first point in time image of first application data;
creating, incrementally refreshing, and retaining a full copy of a second point in time image associated with second application data;
creating and retaining a first deduplicated point in time image of third application data;
creating and retaining a second deduplicated backup of fourth application data at a remote site; and
creating and retaining a third deduplicated backup of fifth application data using asynchronous data replication;
displaying on the ramp a first subset of a first plurality of icons associated with each backup, each of the first plurality of icons located on the ramp according to a first association with one of the plurality of data management policies and a first point in time corresponding to the action;
displaying next to the ramp an adjustable grid including a second subset of a second plurality of icons, the grid including a y-axis associated with the plurality of data management policies and an x-axis associated with the time points associated with the plurality of data management policies, each of the second plurality of icons located on the grid according to a second association with one of the plurality of data management policies and a point in time corresponding to the action, the grid movable along the x-axis;

displaying a third set of a first plurality of icons when receiving first movement instructions to move the ramp; and displaying a fourth set of a second plurality of icons when receiving second movement instructions to move the grid, thereby providing global management of a set of data management services for a plurality of physical and virtual appliances.

2. The method of claim 1, wherein the first copy data management appliance is one of a physical copy data management appliance and a virtual copy data management appliance, further wherein the second copy data management appliance is one of a physical copy data management appliance and a virtual copy data management appliance.

3. The method of claim 1, wherein
moving the protection comprises:
transmitting the third service level template to the second copy data management appliance when the third service level template does not exist on the second copy data management appliance; and
transmitting instructions to the second copy data management appliance to discover and re-protect the first application entity using the third service level template; and
updating the list of backup images associated with the first application entity such that the list reflects protection of the first application entity by the second copy data management appliance.

4. The method of claim 1, wherein the first movement instructions cause both the ramp and grid to move.

5. A computing system for providing global management of a set of data management services being executed by at least one of one or more physical data management appliances and one or more virtual data management appliances, the computing system comprising:
a processor;
a memory coupled to the processor and including instructions that, when executed by the processor, cause the processor to:
transmit first instructions to a first copy data management appliance that cause the first copy data management appliance to send first data associated with protecting a first application entity protected by the first copy data management appliance to the management server, the first data including first service level agreement data associated with the first application entity, the first service level agreement data including a first service level template and a first service level profile, the first service level template including a plurality of first service level policies indicating a first set of schedules associated with backing up the first data, the first service level profile indicating at least one of a plurality of source storage pools and at least one of a plurality of destination storage pools associated with creating a copy of first content data associated with the first application entity;
transmit second instructions to a second copy data management appliance that cause the second copy data management appliance to send second data associated with protecting a second application entity protected by the second copy data management appliance to the management server, the second data including second service level agreement data associated with the second source entity, the second service level agreement data including a second service level template and a second service level profile, the second service level template including a plurality of second service level policies indicating a second set of schedules associated with backing up the second data, the second service level profile indicating at least one of a plurality of source storage pools and at least one of a plurality of destination storage pool associated with creating a copy of second content associated with the second application entity;
receive third data comprising instructions to create a third service level template, the third service level template including a link to the first service level template and to the second service level template such that the first set of schedules and the second set of schedule are merged into a third set of schedules;
create a list of backup images associated with the first data and the second data, and the list of backup images associated with:
one of the first copy data management appliance and the second copy data management appliance, and
one of the first application entity and the second application;
schedule a plurality of data management policies associated with the first copy data management appliance and the second copy data management appliance using the third service level template, the plurality of data management policies comprising at least one of:
creating and retaining a first point in time image of first application data;
creating, incrementally refreshing, and retaining a full copy of a second point in time image associated with second application data;
creating and retaining a first deduplicated point in time image of third application data;
creating and retaining a second deduplicated backup of fourth application data at a remote site; and
creating and retaining a third deduplicated backup of fifth application data using asynchronous data replication;
move protection of the first application entity from the first copy data management appliance to the second copy data management appliance; and
display the list of backup images, wherein displaying the list of backup images includes:
displaying an adjustable ramp, the ramp including an x-axis associated with the plurality of data management policies and a y-axis associated with the time points associated with the plurality of data management policies, the ramp movable along the y-axis, wherein the associated data management policies of the x-axis include at least two of:
creating and retaining a first point in time image of first application data;
creating, incrementally refreshing, and retaining a full copy of a second point in time image associated with second application data;
creating and retaining a first deduplicated point in time image of third application data;
creating and retaining a second deduplicated backup of fourth application data at a remote site; and
creating and retaining a third deduplicated backup of fifth application data using asynchronous data replication;

displaying on the ramp a first subset of a first plurality of icons associated with each backup, each of the first plurality of icons located on the ramp according to a first association with one of the plurality of data management policies and a first point in time corresponding to the action;

displaying next to the ramp an adjustable grid including a second subset of a second plurality of icons, the grid including a y-axis associated with the plurality of data management policies and an x-axis associated with the time points associated with the plurality of data management policies, each of the second plurality of icons located on the grid according to a second association with one of the plurality of data management policies and a point in time corresponding to the action, the grid movable along the x-axis;

displaying a third set of a first plurality of icons when receiving first movement instructions to move the ramp; and displaying a fourth set of a second plurality of icons when receiving second movement instructions to move the grid, thereby providing global management of a set of data management services for a plurality of physical and virtual appliances.

6. The computing system of claim 5, wherein the first copy data management appliance is one of a physical copy data management appliance and a virtual copy data management appliance, further wherein the second copy data management appliance is one of a physical copy data management appliance and a virtual copy data management appliance.

7. The computing system of claim 5,
wherein moving the protection comprises instructions that, when executed by the processor, cause the processor to:
transmitting the third service level template to the second copy data management appliance when the third service level template does not exist on the second copy data management appliance; and
transmitting instructions to the second copy data management appliance to discover and re-protect the first application entity using the third service level template; and
updating the list of backup images associated with the first application entity such that the list reflects protection of the first application entity by the second copy data management appliance.

8. The computing system of claim 5, wherein the first movement instructions cause both the ramp and grid to move.

9. A non-transitory computer readable medium having executable instructions operable to cause an apparatus to:
transmit first instructions to a first copy data management appliance that cause the first copy data management appliance to send first data associated with protecting a first application entity protected by the first copy data management appliance to the management server, the first data including first service level agreement data associated with the first application entity, the first service level agreement data including a first service level template and a first service level profile, the first service level template including a plurality of first service level policies indicating a first set of schedules associated with backing up the first data, the first service level profile indicating at least one of a plurality of source storage pools and at least one of a plurality of destination storage pools associated with creating a copy of first content data associated with the first application entity;

transmit second instructions to a second copy data management appliance that cause the second copy data management appliance to send second data associated with protecting a second application entity protected by the second copy data management appliance to the management server, the second data including second service level agreement data associated with the second source entity, the second service level agreement data including a second service level template and a second service level profile, the second service level template including a plurality of second service level policies indicating a second set of schedules associated with backing up the second data, the second service level profile indicating at least one of a plurality of source storage pools and at least one of a plurality of destination storage pool associated with creating a copy of second content associated with the second application entity;

receive third data comprising instructions to create a third service level template, the third service level template including a link to the first service level template and to the second service level template such that the first set of schedules and the second set of schedule are merged into a third set of schedules;

create a list of backup images associated with the first data and the second data, and the list of backup images associated with:
one of the first copy data management appliance and the second copy data management appliance, and
one of the first application entity and the second application entity;

schedule a plurality of data management policies associated with the first copy data management appliance and the second copy data management appliance using the third service level template, the plurality of data management policies comprising at least one of:
creating and retaining a first point in time image of first application data;
creating, incrementally refreshing, and retaining a full copy of a second point in time image associated with second application data;
creating and retaining a first deduplicated point in time image of third application data;
creating and retaining a second deduplicated backup of fourth application data at a remote site; and
creating and retaining a third deduplicated backup of fifth application data using asynchronous data replication;

move protection of the first application entity from the first copy data management appliance to the second copy data management appliance, and display the list of backup images, wherein displaying the list of backup images includes:
displaying an adjustable ramp, the ramp including an x-axis associated with the plurality of data management policies and a y-axis associated with the time points associated with the plurality of data management policies, the ramp movable along the y-axis, wherein the associated data management policies of the x-axis include at least two of:
creating and retaining a first point in time image of first application data;

creating, incrementally refreshing, and retaining a full copy of a second point in time image associated with second application data;

creating and retaining a first deduplicated point in time image of third application data;

creating and retaining a second deduplicated backup of fourth application data at a remote site; and creating and retaining a third deduplicated backup of fifth application data using asynchronous data replication;

displaying on the ramp a first subset of a first plurality of icons associated with each backup, each of the first plurality of icons located on the ramp according to a first association with one of the plurality of data management policies and a first point in time corresponding to the action;

displaying next to the ramp an adjustable grid including a second subset of a second plurality of icons, the grid including a y-axis associated with the plurality of data management policies and an x-axis associated with the time points associated with the plurality of data management policies, each of the second plurality of icons located on the grid according to a second association with one of the plurality of data management policies and a point in time corresponding to the action, the grid movable along the x-axis;

displaying a third set of a first plurality of icons when receiving first movement instructions to move the ramp; and displaying a fourth set of a second plurality of icons when receiving second movement instructions to move the grid, thereby providing global management of a set of data management services for a plurality of physical and virtual appliances.

10. The non-transitory computer readable medium of claim 9, wherein the first copy data management appliance is one of a physical copy data management appliance and a virtual copy data management appliance, further wherein the second copy data management appliance is one of a physical copy data management appliance and a virtual copy data management appliance.

11. The non-transitory computer readable medium of claim 9,
wherein moving the protection comprises having executable instructions operable to cause the apparatus to:
transmitting the third service level template to the second copy data management appliance when the third service level template does not exist on the second copy data management appliance; and
transmitting instructions to the second copy data management appliance to discover and re-protect the first application entity using the third service level template; and
updating the list of backup images associated with the first application entity such that the list reflects protection of the first application entity by the second copy data management appliance.

12. The non-transitory computer readable medium of claim 9, wherein the first movement instructions cause both the ramp and grid to move.

13. The method of claim 1, wherein the processor in communication with memory configured to display the list of backup images further includes displaying a tab for a selected one of the first or second icons, the information tab including information about the data management policy associated with the selected one of the first or second icons.

14. The computing system of claim 5, wherein the memory includes instructions that, when executed by the processor, cause the processor to display the list of backup images further includes displaying a tab for a selected one of the first or second icons, the information tab including information about the data management policy associated with the selected one of the first or second icons.

15. The non-transitory computer readable medium of claim 9, wherein executable instructions operable to cause the apparatus to display the list of backup images further includes displaying a tab for a selected one of the first or second icons, the information tab including information about the data management policy associated with the selected one of the first or second icons.

* * * * *